US012795735B2

(12) United States Patent
Nagano et al.

(10) Patent No.: US 12,795,735 B2
(45) Date of Patent: Nov. 10, 2026

(54) TERMINAL, BASE STATION AND METHOD FOR APPLYING A TRANSFORM PRECODER TO A PUSCH

(71) Applicants: DENSO CORPORATION, Kariya-city (JP); TOYOTA JIDOSHA KABUSHIKI KAISHA, Toyota (JP)

(72) Inventors: Tatsuki Nagano, Kariya-city (JP); Hideaki Takahashi, Kariya-city (JP); Masayuki Hoshino, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 18/441,146

(22) Filed: Feb. 14, 2024

(65) Prior Publication Data

US 2024/0188142 A1 Jun. 6, 2024

Related U.S. Application Data

(63) Continuation of application No. PCT/JP2022/030714, filed on Aug. 12, 2022.

(30) Foreign Application Priority Data

Aug. 20, 2021 (JP) ................................ 2021-134522

(51) Int. Cl.

*H04W 74/0833* (2024.01)
*H04L 5/00* (2006.01)

(Continued)

(52) U.S. Cl.

CPC ....... *H04W 74/0833* (2013.01); *H04L 5/0048* (2013.01); *H04W 72/1268* (2013.01); *H04W 72/23* (2023.01)

(58) Field of Classification Search

CPC ............ H04W 74/0833; H04W 74/08; H04W 72/1268; H04W 72/23; H04W 72/04; H04L 5/0048; H04L 27/2636

See application file for complete search history.

(56) References Cited

U.S. PATENT DOCUMENTS

| | | | | |
|---|---|---|---|---|
| 11,095,348 | B2 | 8/2021 | Park et al. | |
| 2020/0154428 | A1 * | 5/2020 | Takeda | H04L 27/2636 |

(Continued)

FOREIGN PATENT DOCUMENTS

| | | | |
|---|---|---|---|
| JP | 2019-050470 A | 3/2019 |
| WO | WO-2020003486 A1 | 1/2020 |
| WO | WO-2021/033224 A1 | 2/2021 |

OTHER PUBLICATIONS

3GPP TS 38.300 V15.2.0, (Jun. 2018); 3rd Generation Partnership Project; Technical Specification Group Radio Access Network; NR; NR and NG-RAN Overall Description; Stage 2 (Release 15), pp. 1-87.

(Continued)

*Primary Examiner* — Robert C Scheibel

(74) *Attorney, Agent, or Firm* — Harness, Dickey & Pierce, P.L.C.

(57) ABSTRACT

A terminal includes a receiving unit configured to receive, from a base station, system information including information for configuring a transform precoder to be enabled, receive on a physical downlink control channel (PDCCH), from a base station, a first downlink control information (DCI) format used for scheduling of a physical uplink shared channel (PUSCH), and receive on the PDCCH, from the base station, a second DCI format used for scheduling of the PUSCH; a control unit configured to apply the transform precoder to transmission of the PUSCH scheduled by using the first DCI format based on the information for configuring the transform precoder to be enabled, apply the transform (Continued)

precoder to transmission of the PUSCH scheduled by using the second DCI format based on information indicating whether or not to enable the transform precoder included in the second DCI format, and apply the transform precoder to transmission of the PUSCH in a random access procedure based on the information for configuring the transform precoder to be enabled; and a transmitting unit configured to perform transmission of the PUSCH to which the transform precoder is applied.

14 Claims, 18 Drawing Sheets

(51) Int. Cl.
*H04W 72/1268* (2023.01)
*H04W 72/23* (2023.01)

(56) References Cited

U.S. PATENT DOCUMENTS

| | | | | |
|---|---|---|---|---|
| 2020/0296736 | A1 | 9/2020 | Yokomakura et al. | |
| 2022/0123983 | A1 * | 4/2022 | Levitsky | H04L 27/2678 |
| 2022/0322411 | A1 * | 10/2022 | Matsumura | H04W 72/23 |
| 2024/0334432 | A1 * | 10/2024 | Matsumura | H04W 72/232 |
| 2025/0089065 | A1 * | 3/2025 | Matsumura | H04W 72/12 |

OTHER PUBLICATIONS

3GPP TSG RAN WG1 #105-e, R1-2105123, Apple Inc., Discussion on Msg3 Coverage Enhancement[online], e-Meeting, May 10-27, 2021, pp. 1-4.

* cited by examiner

Fig. 7

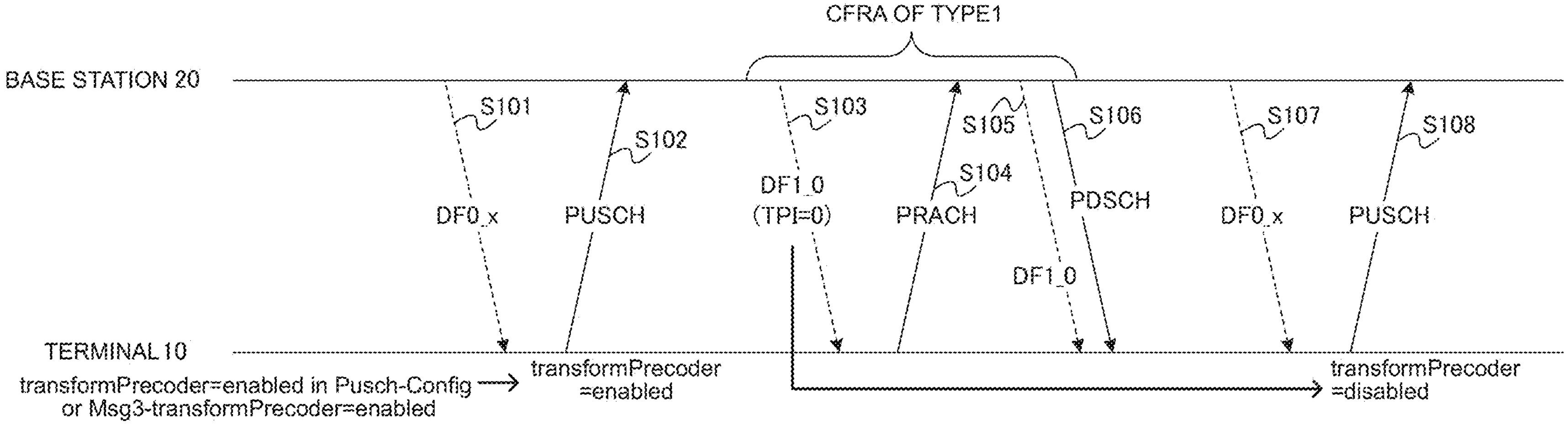

For PUSCH transmission scheduled by a PDCCH with CRC scrambled by CS-RNTI with NDI=1, C-RNTI, or MCS-C-RNTI or SP-CSI-RNTI:

- If the DCI with the scheduling grant was received with DCI format 0_0,
  - If the transform precoder has been enabled or disabled by receiving the transform precoder indicator via DCI format 1_0, the UE shall, for this PUSCH transmission, consider the transform precoding either enabled or disabled according to the transform precoder indicator.
  - Else, the UE shall, for this PUSCH transmission, consider the transform precoding either enabled or disabled according to the higher layer configured parameter *msg3-transformPrecoder*.
- If the DCI with the scheduling grant was not received with DCI format 0_0
  - If the transform precoder has been enabled or disabled by receiving the transform precoder indicator via DCI format 1_0, the UE shall, for this PUSCH transmission, consider the transform precoding either enabled or disabled according to the transform precoder indicator.
  - Else if the UE is configured with the higher layer parameter *transformPrecoder* in *pusch-Config*, the UE shall, for this PUSCH transmission, consider the transform precoding either enabled or disabled according to this parameter.
  - Else if the UE is not configured with the higher layer parameter *transformPrecoder* in *pusch-Config*, the UE shall, for this PUSCH transmission, consider the transform precoding either enabled or disabled according to the higher layer configured parameter *msg3-transformPrecoder*.

Fig. 8

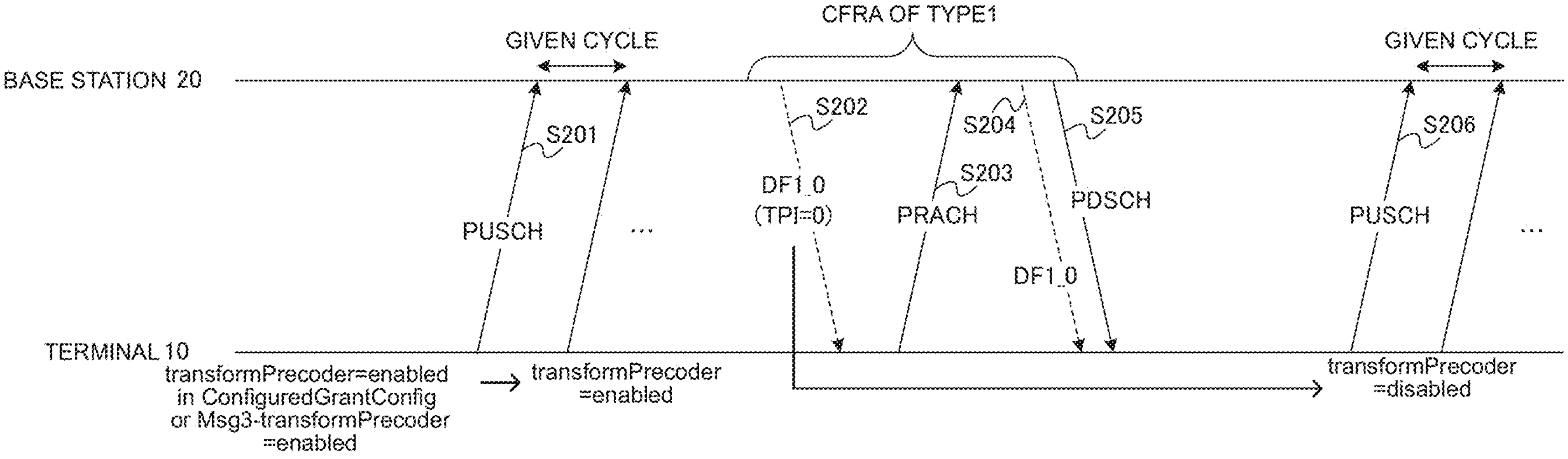

For PUSCH transmission with a configured grant

- If the transform precoder has been enabled or disabled by receiving the transform precoder indicator via DCI format 1_0, the UE shall, for this PUSCH transmission, consider the transform precoding either enabled or disabled according to the transform precoder indicator.
- Else if the UE is configured with the higher layer parameter *transformPrecoder* in *configuredGrantConfig*, the UE shall, for this PUSCH transmission, consider the transform precoding either enabled or disabled according to this parameter.
- Else if the UE is not configured with the higher layer parameter *transformPrecoder* in *configuredGrantConfig*, the UE shall, for this PUSCH transmission, consider the transform precoding either enabled or disabled according to the higher layer configured parameter *msg3-transformPrecoder*.

Fig. 9

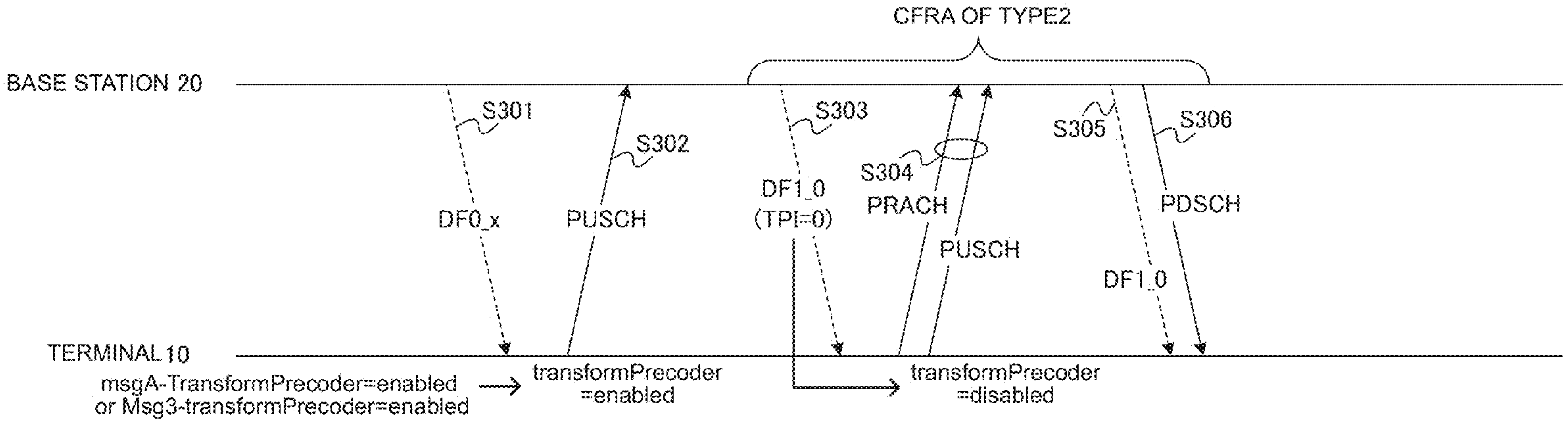

For a MsgA PUSCH,

- If the transform precoder has been enabled or disabled by receiving the transform precoder indicator via DCI format 1_0, the UE shall, for this PUSCH transmission, consider the transform precoding either enabled or disabled according to the transform precoder indicator.
- Else, the UE shall consider the transform precoding either 'enabled' or 'disabled' according to the higher layer configured parameter *msgA-TransformPrecoder*. If higher layer parameter *msgA-TransformPrecoder* is not configured, the UE shall consider the transform precoding either 'enabled' or 'disabled' according to the higher layer configured parameter *msg3-transformPrecoder*.

Fig. 12

| | | | | | | | | |
|---|---|---|---|---|---|---|---|---|
| A/D | SERVING CELL ID | | | | | BWP ID | | Oct1 |
| R | R | R | R | R | R | SUL | TPI | Oct2 |

Fig. 13

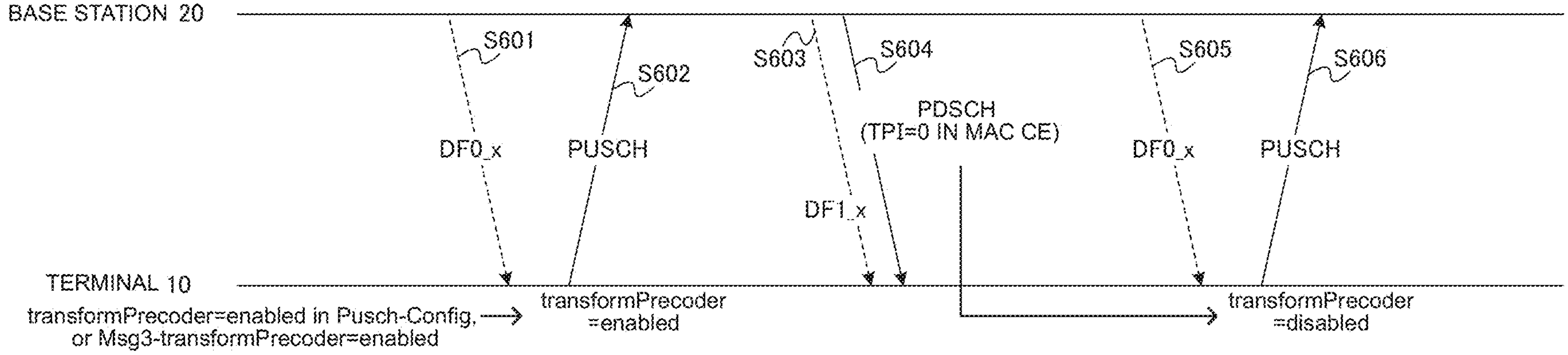

For PUSCH transmission scheduled by a PDCCH with CRC scrambled by CS-RNTI with NDI=1, C-RNTI, or MCS-C-RNTI or SP-CSI-RNTI:

- If the DCI with the scheduling grant was received with DCI format 0_0,
  - If the transform precoder has been enabled or disabled by receiving the transform precoder indicator via the Transform Precoder Activation/Deactivation MAC CE, as defined in TS 38.321, the UE shall, for this PUSCH transmission, consider the transform precoding either enabled or disabled according to the transform precoder indicator.
  - Else, the UE shall, for this PUSCH transmission, consider the transform precoding either enabled or disabled according to the higher layer configured parameter *msg3-transformPrecoder*.
- If the DCI with the scheduling grant was not received with DCI format 0_0
  - If the transform precoder has been enabled or disabled by receiving the transform precoder indicator via the Transform Precoder Activation/Deactivation MAC CE, as defined in TS 38.321, the UE shall, for this PUSCH transmission, consider the transform precoding either enabled or disabled according to the transform precoder indicator.
  - Else if the UE is configured with the higher layer parameter *transformPrecoder* in *pusch-Config*, the UE shall, for this PUSCH transmission, consider the transform precoding either enabled or disabled according to this parameter.
  - Else if the UE is not configured with the higher layer parameter *transformPrecoder* in *pusch-Config*, the UE shall, for this PUSCH transmission, consider the transform precoding either enabled or disabled according to the higher layer configured parameter *msg3-transformPrecoder*.

Fig. 14

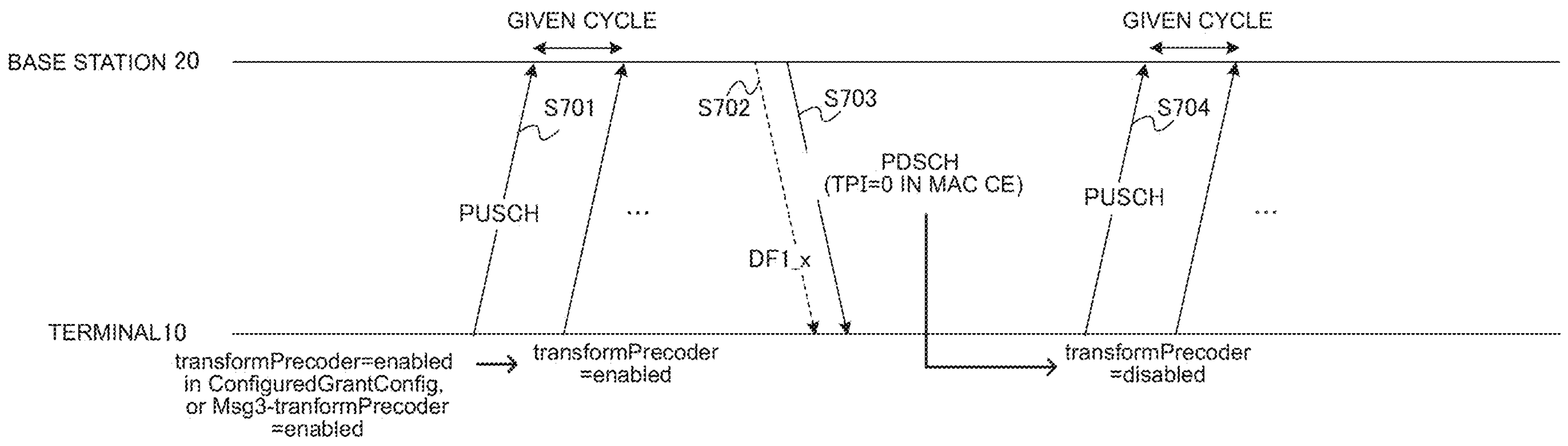

For PUSCH transmission with a configured grant

- If the transform precoder has been enabled or disabled by receiving the transform precoder indicator via the Transform Precoder Activation/Deactivation MAC CE, as defined in TS 38.321, the UE shall, for this PUSCH transmission, consider the transform precoding either enabled or disabled according to the transform precoder indicator.
- Else if the UE is configured with the higher layer parameter *transformPrecoder* in *configuredGrantConfig*, the UE shall, for this PUSCH transmission, consider the transform precoding either enabled or disabled according to this parameter.
- Else if the UE is not configured with the higher layer parameter *transformPrecoder* in *configuredGrantConfig*, the UE shall, for this PUSCH transmission, consider the transform precoding either enabled or disabled according to the higher layer configured parameter *msg3-transformPrecoder*.

Fig. 15

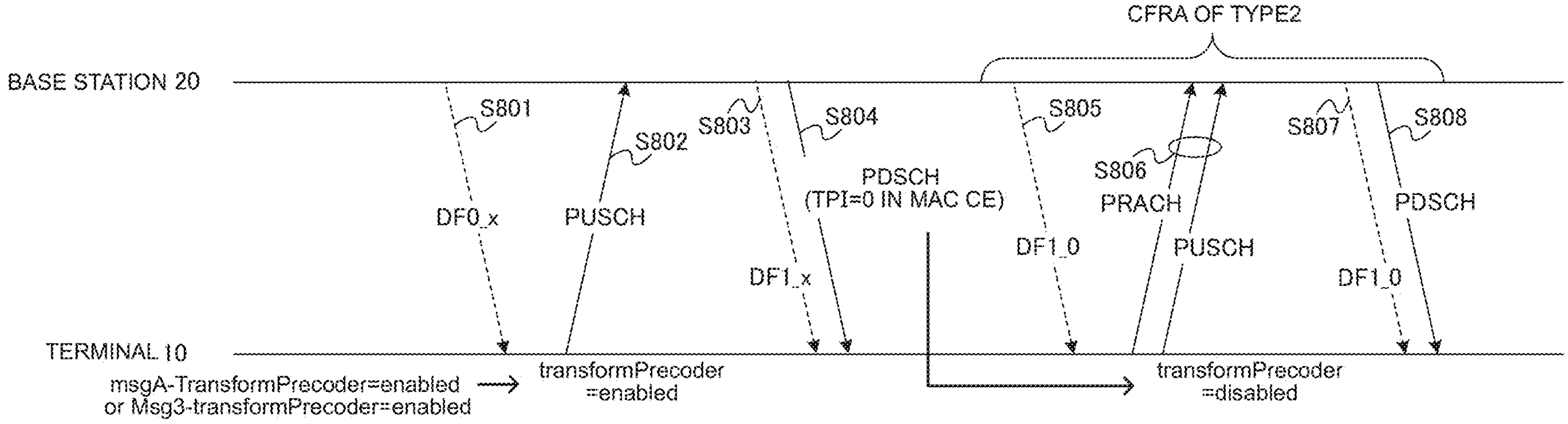

For a MsgA PUSCH,

- If the transform precoder has been enabled or disabled by receiving the transform precoder indicator via the Transform Precoder Activation/Deactivation MAC CE, as defned in TS 38.321, the UE shall, for this PUSCH transmission, consider the transform precoding either enabled or disabled according to the transform precoder indicator.
- Else, the UE shall consider the transform precoding either 'enabled' or 'disabled' according to the higher layer configured parameter *msgA-TransformPrecoder*. If higher layer parameter *msgA-TransformPrecoder* is not configured, the UE shall consider the transform precoding either 'enabled' or 'disabled' according to the higher layer configured parameter *msg3-transformPrecoder*.

TERMINAL, BASE STATION AND METHOD FOR APPLYING A TRANSFORM PRECODER TO A PUSCH

CROSS-REFERENCE TO RELATED APPLICATIONS

This application is a continuation application of International Patent Application No. PCT/JP2022/030714, filed Aug. 12, 2022, which designated the U.S. and claims the benefit of priority to Japanese Patent Application No. 2021-134522, filed Aug. 20, 2021. The entire contents of the above applications are incorporated herein by reference.

TECHNICAL FIELD

This disclosure relates to a terminal and a wireless communication method.

BACKGROUND

In the Third Generation Partnership Project (3GPP) as an international standards organization, New Radio (NR) Release 15 as the 5th generation (5G) Radio Access Technology (RAT) is specified as a successor to Long Term Evolution (LTE) as the 3.9th generation RAT and LTE-Advanced as the 4th generation RAT, for example, Non-Patent Document 1: 3GPP TS 38.300 V15.2.0 (2018 June). LTE and/or LTE-Advanced are also called Evolved Universal Terrestrial Radio Access (E-UTRA).

SUMMARY

In releases 15 and 16 of the NR, it is possible to apply orthogonal frequency division multiplexing (OFDM) (hereinafter, referred to as "CP-OFDM") using a cyclic prefix (CP) as the waveform of the signal or a discrete Fourier transform spreading (DFT spreading) OFDM (hereinafter, "DFT-s-OFDM"). DFT-s-OFDM is a CP-OFDM to which a function of performing DFT spreading (hereinafter, referred to as "transform precoder") is applied. Therefore, it is possible to switch whether to use a waveform of DFT-s-OFDM or CP-OFDM, depending on whether or not to apply the transform precoder.

In releases 15 and 16 of the NR, it is configured whether or not to apply the transform precoder to the terminal using signaling (hereinafter, referred to as "RRC signaling") of a radio resource control (RRC) layer by a network (for example, a base station). However, since the processing delay at the terminal is larger in a case where the RRC signaling is used as compared with a case where the signaling is used in a layer lower than the RRC layer, there is a risk that it may not be possible to switch whether or not to apply the transform precoder at an appropriate timing according to the wireless situation.

One of the objects of the present disclosure is to provide a terminal and a wireless communication method capable of appropriately switching whether or not to apply the transform precoder.

A terminal according to one aspect of the present disclosure includes a transmitting unit configured to transmit an uplink signal, a receiving unit configured to receive downlink control information (DCI) including information on a transform precoder or a medium access control element (MAC CE), and a control unit configured to determine whether or not to apply the transform precoder to the uplink signal based on information about the transform precoder.

According to one aspect of the present disclosure, one of the objects is to provide a terminal and a wireless communication method capable of appropriately switching whether or not to apply the transform precoder.

BRIEF DESCRIPTION OF DRAWINGS

FIG. 7 is a diagram illustrating a first example of a first switching operation according to the present embodiment.

FIG. 8 is a diagram illustrating a second example of the first switching operation according to the present embodiment.

FIG. 9 is a diagram illustrating a third example of the first switching operation according to the present embodiment.

FIG. 12 is a diagram illustrating an example of a MAC CE including a TPI according to the present embodiment.

FIG. 13 is a diagram illustrating a first example of a second switching operation according to the present embodiment.

FIG. 14 is a diagram illustrating a second example of the second switching operation according to the present embodiment.

FIG. 15 is a diagram illustrating a third example of the second switching operation according to the present embodiment.

DETAILED DESCRIPTION

Figure 1:
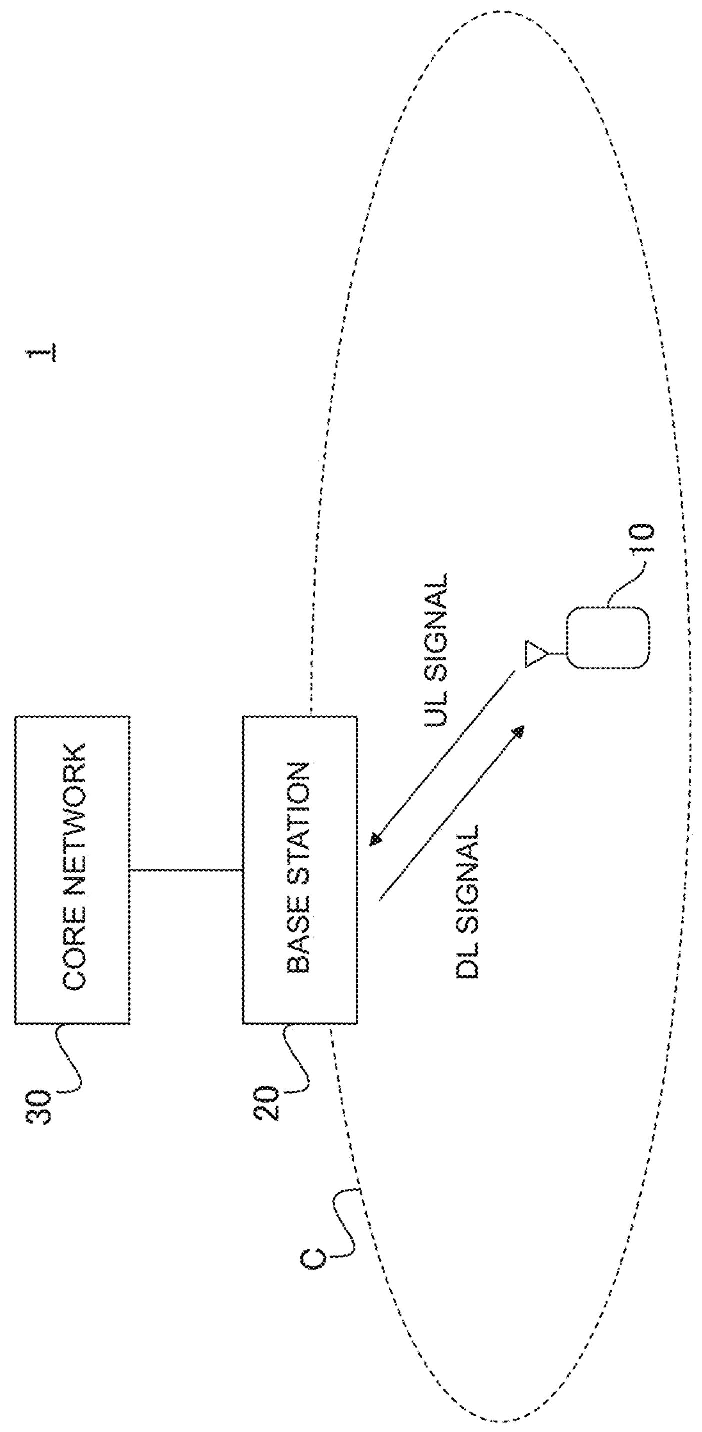
FIG. 1 is a diagram illustrating an example of the overview of a wireless communication system according to the present embodiment.

Hereinafter, the present embodiment will be described with reference to the drawings. In order to facilitate understanding of the description, the same reference numerals will be given to the same components in each drawing as much as possible, and repeated descriptions will be omitted.

FIG. 1 is a diagram illustrating an example of the overview of a wireless communication system according to the present embodiment. As illustrated in FIG. 1, a wireless communication system 1 may include a terminal 10, a base station 20, and a core network 30. Note that the number of terminals 10 or base stations 20 illustrated in FIG. 1 is just an illustrative example, and the number is not limited to that illustrated.

As Radio Access Technology (RAT) of the wireless communication system 1, for example, NR is assumed, but it is not limited to NR, and various RATs such as the 6th generation (6G) RAT or later can be utilized.

The terminal 10 is a given terminal or equipment such as a smartphone, a personal computer, an in-vehicle terminal, an in-vehicle device, a stationary device, or a telematics control unit (TCU), for example. The terminal 10 may also be called User Equipment (UE), a Mobile Station (MS), a terminal (User Terminal), a radio apparatus, a subscriber terminal, an access terminal, or the like. The terminal 10 may be of a mobile type or a fixed type. The terminal 10 is configured communicably using NR as RAT, for example.

The base station 20 forms one or more cells C to communicate with the terminal 10 using each of the cells. The cell C may also be mutually rephrased as a serving cell, a carrier, a component carrier (CC), and the like. For example, the base station 20 may configure one primary cell and one or more secondary cells for the terminal 10 and communicate with the terminal 10 (also called carrier aggregation). That is, the one or more cells C include at least a primary cell and may include a secondary cell.

One or more bandwidth parts (BWPs) may be configured on one cell C. Here, BWPs mainly used when the terminal 10 initially accesses a cell are also called an initial down BWP (Initial Downlink (DL) BWP) and an initial up BWP (Initial Uplink (UL) BWP). For example, the base station 20 may broadcast information to be included in system information, which is used to configure respective frequency locations, respective bandwidths, respective subcarrier spacings, and/or respective cyclic prefixes for the initial down BWP and the initial up BWP.

The base station 20 may also be called a gNodeB (gNB), an en-gNB, a Next Generation-Radio Access Network (NG-RAN) node, a low-power node, a Central Unit (CU), a Distributed Unit (DU), a gNB-DU, a Remote Radio Head (RRH), an Integrated Access and Backhaul/Backhauling (IAB) node, or the like. The base station 20 is not limited to one node and may be constituted by a plurality of nodes (for example, a combination of a lower node such as a DU and an upper node such as a CU).

The core network 30 is, for example, an NR-compatible core network (5G Core Network: 5GC), but the core network 30 is not limited thereto. A device on the core network 30 (hereinafter also be referred to as a "core network device") performs mobility management such as paging and location registration of the terminal 10. The core network device may be connected to the base station 20 through a given interface (for example, S1 or NG interface).

The core network device may include, for example, at least one of Access and Mobility Management Function (AMF) for managing C-plane information (e.g., information related to access, mobility management, and the like), and User Plane Function (UPF) for transmission control of U-plane information (e.g., user data).

In the wireless communication system 1, the terminal 10 receives a down (downlink: DL) signal from the base station 20 and/or transmits an up (uplink: UL) signal to the base station 20. One or more cells C are configured for the terminal 10, and at least one of the cells thus configured is activated. The maximum bandwidth of each cell is, for example, 20 MHz, 400 MHz, or the like.

Further, the terminal 10 performs cell search based on a synchronization signal (for example, Primary Synchronization Signal (PSS) and/or Secondary Synchronization Signal (SSS)) from the base station 20. The cell search is a procedure of the terminal 10 acquiring synchronization of time and frequency in a cell and detecting an identifier of the cell (for example, a physical layer cell ID).

A block including at least one of the synchronization signal, a Physical Broadcast Channel (PBCH), and a Demodulation Reference Signal (DMRS) for the PBCH is also called a Synchronization Signal Block (SSB), an SS/PBCH block, or the like. One or more SSBs may constitute one SS burst, and one or more SS bursts may constitute one SS burst set. An SS burst set may be transmitted at a given cycle (for example, 20 ms (two radio frames)). In a case of multi-beam operation, SSBs of different indices may correspond to different beams and may be transmitted by switching a beam direction sequentially by beam sweeping.

The terminal 10 determines a search space set and/or a Control Resource Set (CORESET) based on a parameter (hereinafter referred to as an "RRC parameter") included in RRC message and performs monitoring of Downlink Control Information (DCI) transferred through a Physical Downlink Control Channel (PDCCH)) in the search space set associated with the CORESET. Note that the RRC message may include, for example, an RRC set-up message, an RRC reconfiguration message, an RRC resume message, system information, and so on.

The monitoring of DCI means that the terminal 10 performs blind decoding on a PDCCH candidate in a search space set by a predicted DCI format. A bit number (also referred to as size, bit width, or the like) of a DCI format is determined or derived in advance in accordance with a bit number of a field included in the DCI format. The terminal 10 detects DCI for the terminal 10 based on the bit number of a DCI format, and a specific Radio Network Temporary Identifier (RNTI) used for scrambling (hereinafter referred to as "CRC-scrambling") of a Cyclic Redundancy Check (CRC) bit (also called a CRC parity bit) of the DCI format. The monitoring of DCI is also called PDCCH monitoring, monitor, or the like. Further, a period for performing the monitoring of DCI is also called a PDCCH monitoring occasion.

The search space set is a collection of one or more search spaces and may include a search space set (hereinafter referred to as a "common search space (CSS) set) used in common by one or more terminals 10, and a terminal-specific search space set (a UE-specific search space (USS) set). The search space set used for PDCCH monitoring of the terminal 10 may be configured to the terminal 10 using higher layer parameters (for example, RRC Information Element (IE) "SearchSpace", RRC IE "pagingSearchSpace", RRC IE "searchSpaceSIB1", RRC IE "searchSpaceOtherSystemInformation", and the like). The terminal 10 detects the DCI that is CRC-scrambled by the RNTI through PDCCH monitoring using the search space set, and controls reception of a physical downlink shared channel (PDSCH) scheduled using the DCI and/or transmission of the physical uplink shared channel (PUSCH).

The system information broadcasted in the cell C may include a master information block (MIB) and/or one or more system information blocks (SIB). The MIB is broadcasted via the PBCH. The MIB and SIB1 are also referred to as minimum system information, and the SIB1 is also referred to as remaining minimum system information (RMSI). SIB1 is broadcasted via PDSCH. SIBx (an arbitrary character string such as x=2, 3, . . . ) other than SIB1 is also referred to as other system information (OSI). SIB1 is cell-specific, and SIBx other than SIB1 is cell-specific or area-specific including one or more cells. The area is also referred to as a system information area or the like.

In the wireless communication system 1, the terminal 10 transitions a plurality of states (for example, an idle state, an inactive state, and a connected state) related to a connection (hereinafter, referred to as "RRC connection") of the RRC layer.

Here, the idle state is a state where the RRC connection is not established between the terminal 10 and the base station 20, and is also called RRC_IDLE, an idle mode, an RRC idle mode, or the like. The terminal 10 in the idle state receives system information broadcasted in a camp-on cell C. When the RRC connection is established (again), the terminal 10 in the idle state transitions to the connected state. When the terminal 10 in the idle state receives a message for establishing the RRC connection (hereinafter, referred to as "RRC set-up message", for example, "RRCSetup") from the base station 20, the RSC connection is established. Further, the terminal 10 receives a message for re-establishing the RRC connection (hereinafter, referred to as an "RRC re-establishment message", for example, "RRCReestablishment") from the base station 20 to re-establish the RRC connection.

Further, the inactive state is a state where the RRC connection is established but is suspended and is also called an RRC_INACTIVE state, an inactive mode, an RRC inactive mode, and the like. The terminal 10 in the inactive state receives the system information broadcast in the camp-on cell C. When the RRC connection is resumed, the terminal 10 in the inactive state transitions to the connected state, and when the RRC connection is released, the terminal 10 transitions to the idle state. The terminal 10 in the inactive state receives an RRC set-up message or a message for resuming an RRC connection (hereinafter, referred to as an "RRC resume message", for example, "RRCResume") from the base station 20 such that the RRC connection is restarted.

The connected state is a state where the RRC connection is established and is also called an RRC_CONNECTED state, a connected mode, an RRC connected mode, and the like. When the RRC connection is released, the terminal 10 in the connected state transitions to the idle state, and when the RRC connection is suspended, the terminal 10 transitions to the inactive state. When the terminal 10 in the connected state receives an "RRC connection release message" (hereinafter, referred to as "RRC release message", for example, "RRCRelease") from the base station 20, the RRC connection is released. Further, when the terminal 10 in the connected state receives a "RRC connection reconfiguration message" (hereinafter, referred to as "RRC reconfiguration message", for example, "RRCReconfiguration") from the base station 20, the RRC connection is modified.

Random Access Procedure

As the random access procedure in the wireless communication system 1, a contention based random access (CBRA) and a contention free random access (CFRA) may be supported.

The CBRA is a random access procedure performed using a random access preamble that is randomly selected by the terminal 10, and a contention may occur between the terminals 10 that use the same random access preamble. On the other hand, the CFRA is a random access procedure performed using the random access preamble assigned by the base station 20 and the contention between the terminals 10 does not occur. When the random access preamble is assigned to the terminal 10 using PDCCH, the CFRA is also referred to as a random access procedure initiated by a PDCCH order.

In addition, two types of CBRA and CFRA are supported, respectively. The first type is called a type 1, a type-1 random access procedure, a 4-step RACH, a 4-step random access, or the like. The second type is called a type 2, a type-2 random access procedure, a two-step RACH, a two-step random access, or the like.

Figure 2A:
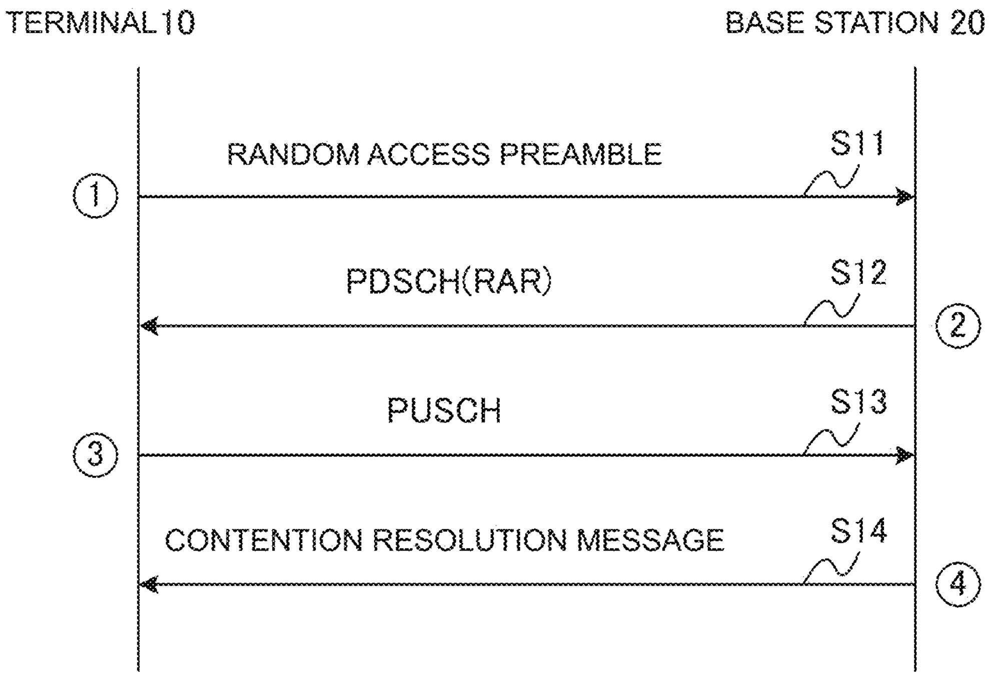
FIGS. 2A and 2B are diagrams illustrating an example of type 1 CBRA and CFRA.
Figure 2B:
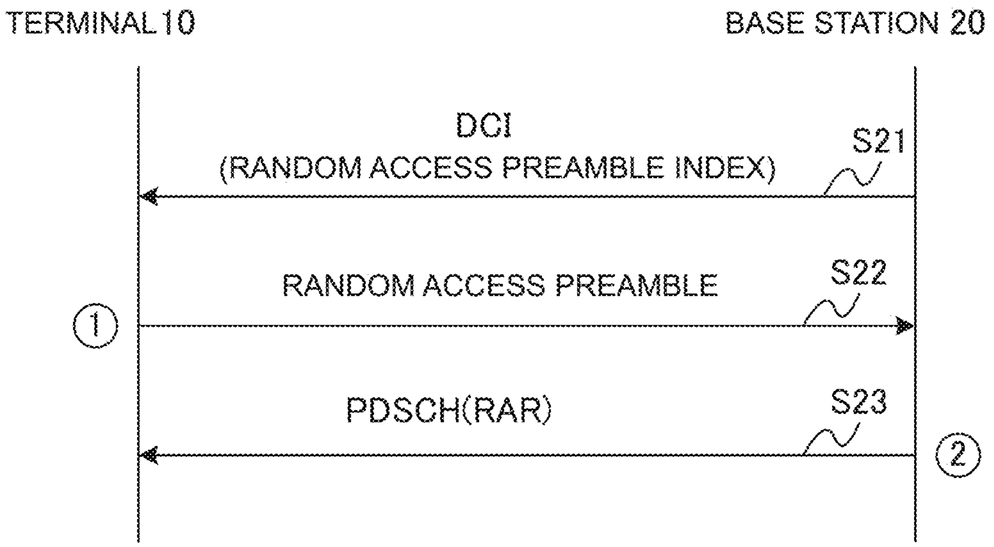

FIGS. 2A and 2B are diagrams illustrating an example of type 1 CBRA and CFRA. As illustrated in FIG. 2A, in the type 1 CBRA, in step S11, the terminal 10 transmits the random access preamble to the base station 20 via a physical random access channel (PRACH). The random access preamble may be paraphrased as message 1, PRACH, RACH, RACH preamble, sequence, preamble, or the like.

In step S12, the terminal 10 receives a response message (hereinafter, referred to as "random access response (RAR))" to the random access preamble via the PDSCH. The RAR may be paraphrased as message 2, MAC RAR, or the like. The RAR may include, for example, information on PUSCH scheduling (hereinafter, referred to as "UL grant"), an uplink timing correction value (hereinafter, referred to as a "timing advanced (TA)" command), and/or an identifier of the terminal 10. The identifier of the terminal 10 may be a temporary identifier (also referred to as "Temporary Cell (TC)-RNTI") or a cell (C)-RNTI which is an identifier of the terminal 10 in the Cell C. The UL grant in RAR is also referred to as "RAR UL grant".

In step S13, the terminal 10 transmits a message requesting establishment of the RRC connection (hereinafter, referred to as "RRC set-up request") via the PUSCH scheduled by the UL grant in the RAR. The RRC set-up request may be paraphrased as a message (MSG) 3, MSG3 PUSCH, "RRCSetupRequest", or the like. The establishment of the RRC connection may be paraphrased as the establishment of a signaling radio bearer (SRB). The RRC set-up request may include the identifier of the terminal 10 (for example, the above-described TC-RNTI or C-RNTI).

In step S14, the terminal 10 receives a message for setting up the RRC connection (hereinafter referred to as "RRC set-up") via the PDSCH in response to the RRC set-up request. The RRC set-up may be paraphrased as the message 4, the contention resolution message, "RRCSetup", or the like. The DCI used for the Scheduling of the PDSCH is CRC-scrambled by the identifier of the terminal 10 (for example, the above-described TC-RNTI or C-RNTI) in step S13, and the contention may be resolved by detecting the DCI. As described above, the type 1 CBRA is performed in four steps S11, S12, S13, and S14 illustrated in FIG. 2A.

On the other hand, as illustrated in FIG. 2B, in the type 1 CFRA, in step S21, the terminal 10 detects the DCI (for example, DCI format 1_0) CRC-scrambled by the identifier (for example, C-RNTI) of the terminal 10 by monitoring the search space set configured in the terminal 10. When the terminal 10 has a specific value (for example, all "1") in a specific field of the DCI (for example, a frequency region allotment field), the terminal 10 may determine that the DCI is a random access procedure started by the PDCCH order.

In step S22, when the DCI received in step S21 is determined to be the random access procedure started by the PDCCH order, the terminal 10 transmits the random access preamble specified by the value of a given field (for example, a random access preamble index field) in the DCI using PRACH.

In step S23, the terminal 10 receives the RAR for the random access preamble via the PDSCH. As described above, the type 1 CFRA is performed in steps S21 and S22 illustrated in FIG. 2B.

Figure 3A:
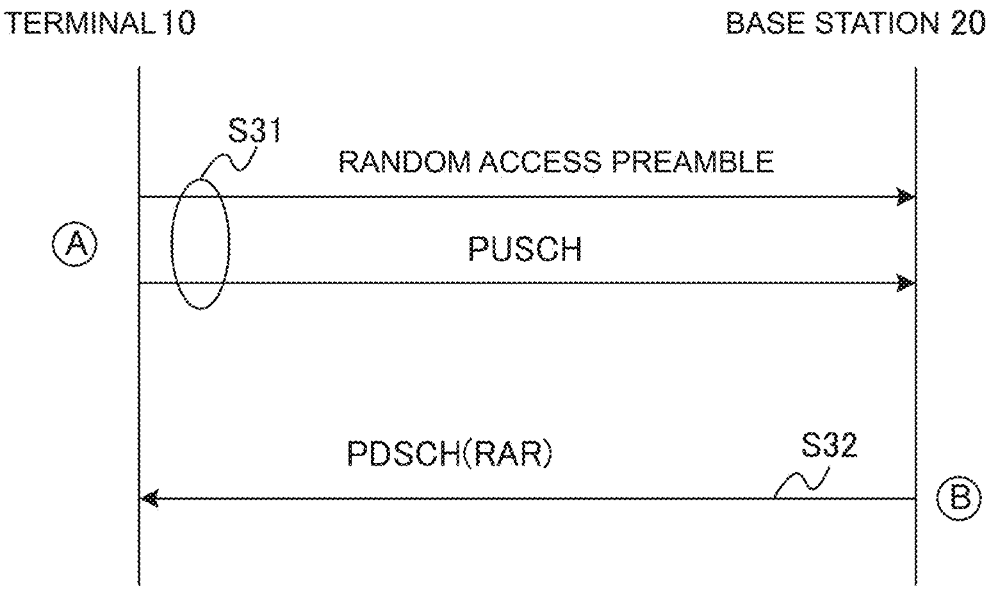
FIGS. 3A and 3B are diagrams illustrating an example of type 2 CBRA and CFRA.
Figure 3B:
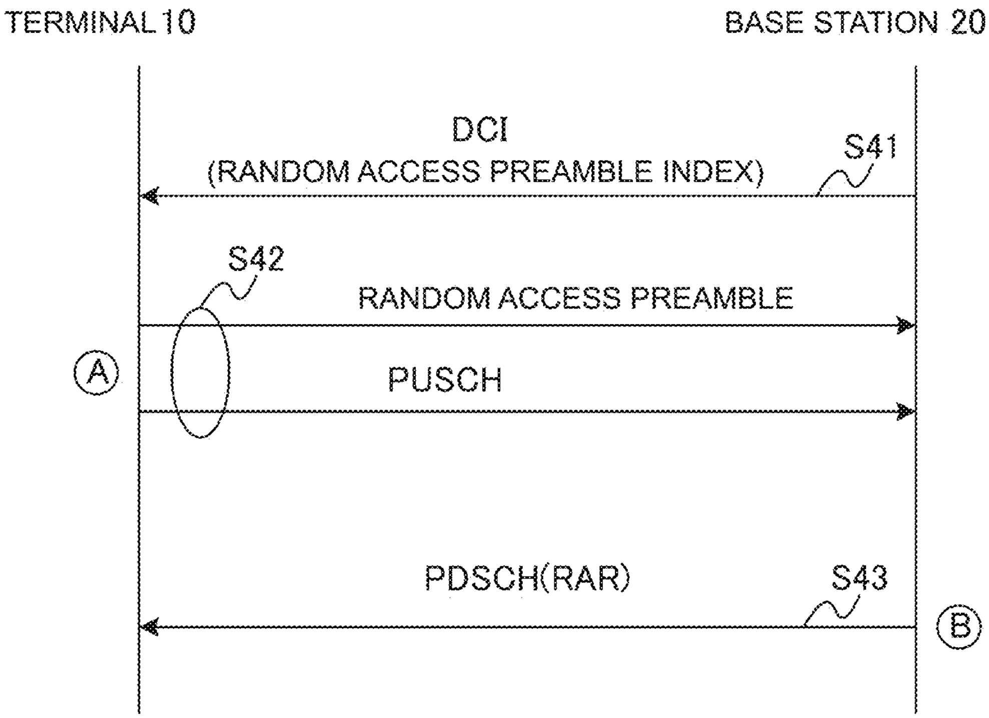

FIGS. 3A and 3B are diagrams illustrating an example of type 2 CBRA and CFRA. In the type 2 CBRA as illustrated in FIG. 3A, steps S11 and S13 in the type 1 CBRA of FIG. 2A are integrated into a single step S31 (step A), and steps S12 and S14 are integrated into a single step S32 (step B).

As illustrated in FIG. 3A, in a type 2 CBRA, in step S31, the terminal 10 selects the random access preamble from a plurality of random access preambles, transmits the selected random access preamble via the PRACH, and transmits the PUSCH. The random access preamble and the PUSCH are also referred to as message A, and step S31 is also referred to as step A.

In step S32, the terminal 10 transmits the message B corresponding to the message A. The message B corresponds to the above-described RAR and contention resolution message, and may include, for example, a Timing Adjustment (TA) command and/or the identifier of the terminal 10 (for example, TC-RNTI or C-RNTI). The terminal 10 monitors the CRC-scrambled DCI (for example, DCI format 1_0) with a specific RNTI (for example, MsgB-RNTI). The terminal 10 detects the DCI, and if the DCI satisfies a given condition, receives the transport block via the PDSCH scheduled by the DCI.

On the other hand, as illustrated in FIG. 3B, in a type 2 CFRA, in step S41, the terminal 10 detects the CRC-scrambled DCI (for example, DCI format 1_0) by the identifier of the terminal 10 (for example, TC-RNTI or C-RNTI) by monitoring the search space set configured in the terminal 10. When the terminal 10 has a specific value (for example, all “1”) in a specific field of the DCI (for example, a frequency region allotment field), the terminal 10 may determine that the DCI is a random access procedure started by the PDCCH order.

As illustrated in FIG. 3B, in step S42, the terminal 10 transmits the random access preamble specified based on the DCI received in step S41 via the PRACH, and thus, the process is different from step S31 of FIG. 3A. Step S42 of FIG. 3B is the same as step S32 of FIG. 3A.

Figure 4:
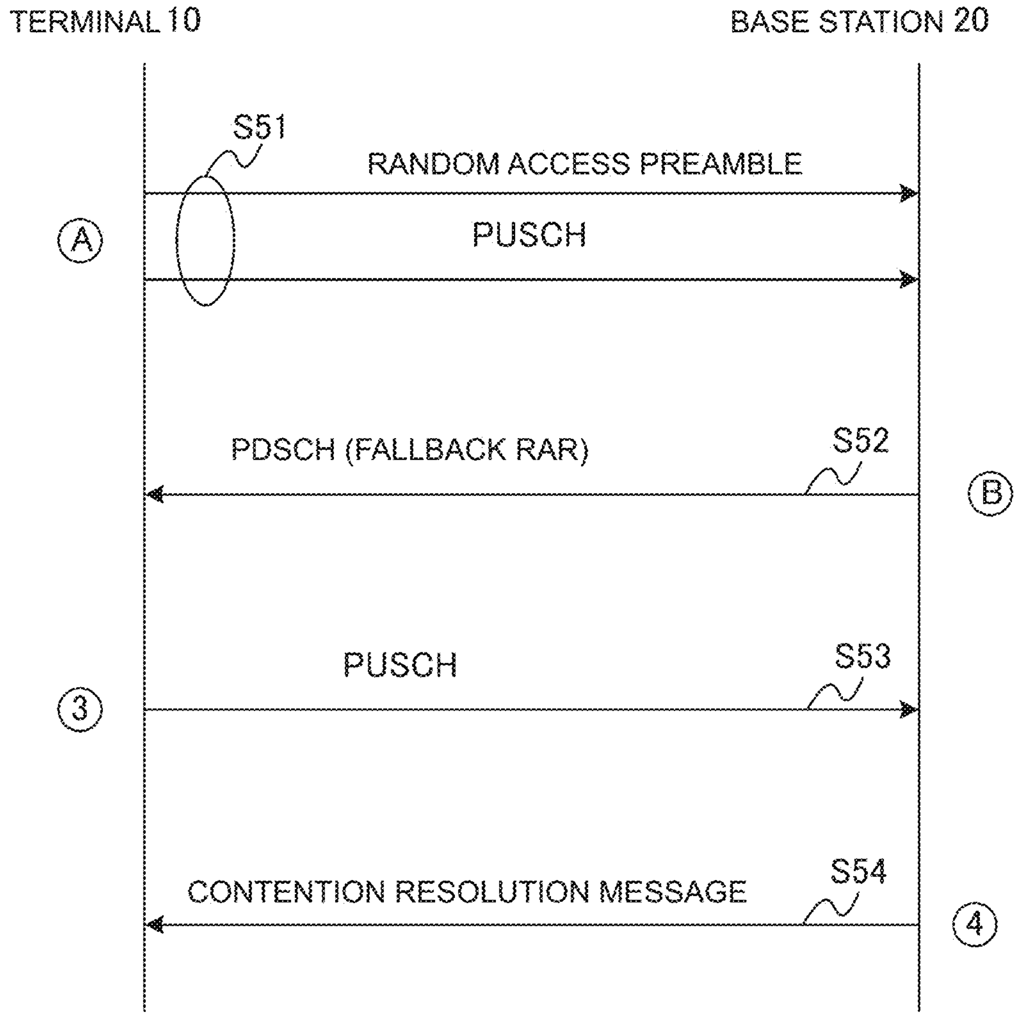
FIG. 4 is a diagram illustrating an example of fallback of a type 2 CBRA to a type 1.

FIG. 4 is a diagram illustrating an example of fallback of type 2 CBRA to type 1. Step S51 of FIG. 4 is the same as step S31 of FIG. 3A. In step S52 of FIG. 4, the base station 20 transmits a response message (hereinafter, referred to as “fallback RAR)” to the message A in step S51. The fallback RAR may include, for example, information indicating a random access preamble index (Random Access Preamble ID field), UL grant, TA command, and/or, the identifier of the terminal 10 (for example, TC-RNTI or C-RNTI) transmitted in step S51. Steps S53 and S54 of FIG. 4 are the same as steps S13 and S14 of FIG. 2A.

Waveform

The waveform of the signal transmitted and received by the wireless communication system 1 may be CP-OFDM or DFT-s-OFDM. For example, either CP-OFDM or DFT-s-OFDM may be used for the uplink signal (for example, PUSCH and/or phase-tracking-reference-signals (PTRS)). On the other hand, CP-OFDM may be used for the downlink signal (for example, PDSCH) and a signal from another terminal 10 (hereinafter, referred to as “sidelink signal”, for example, a physical sidelink shared channel (PSSCH)). The sidelink is a direct communication between the terminals 10.

Since CP-OFDM is a multi-carrier waveform, it has an advantage of being resistant to multi-pass interference, but has a drawback of increasing a peak to average power ratio (PAPR). Further, since the CP-OFDM is the multi-carrier waveform, the transmission data sequence and the reference signal (RS) can be frequency-divided and pluralized on different subcarriers of the same symbol. Further, since the transmission band of the CP-OFDM transmission signal is not limited to a continuous frequency band (for example, one or more continuous physical resource blocks (PRB)) and may be constituted of a discontinuous frequency band (for example, a plurality of discontinuous PRBs), there are less scheduling restrictions as compared with DFT-s-OFDM. Therefore, for example, in a cell where the load is higher than a given level, the frequency utilization efficiency can be improved by using CP-OFDM.

Since DFT-s-OFDM is the single carrier waveform, PAPR can be reduced as compared with CP-OFDM. Therefore, it is possible to use power close to the maximum rated power, and to use a higher order modulation method and/or a higher encoding rate. As a result, the power consumption of the terminal 10 and/or the cost of the terminal 10 can be reduced. In addition, it becomes easier to secure a coverage area. On the other hand, in DFT-s-OFDM, a transmission data sequence and RS of a certain terminal 10 are time-divided and pluralized on different symbols. That is, the transmission data sequence and RS of a certain terminal 10 are different from CP-OFDM without frequency-dividing and pluralizing on different subcarriers of the same symbol. In addition, the transmission band of the DFT-s-OFDM transmission signal is limited to the continuous frequency band (for example, one or more continuous PRBs).

Figure 5A:
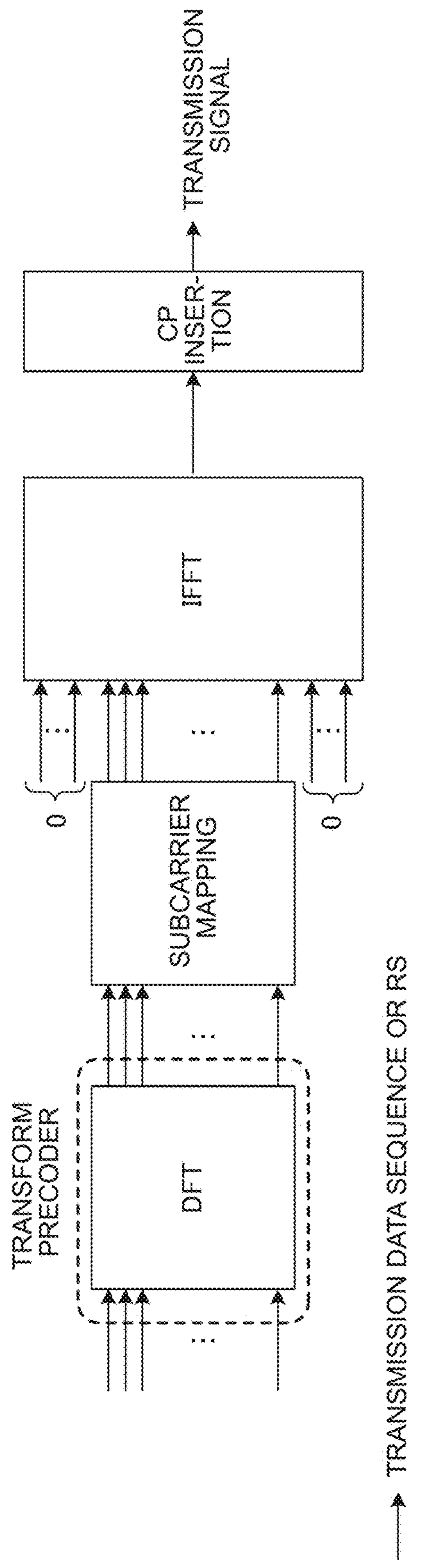
FIGS. 5A and 5B are diagrams illustrating an example of a transmission block of DFT-s-OFDM and CP-OFDM, respectively, according to the present embodiment.
Figure 5B:
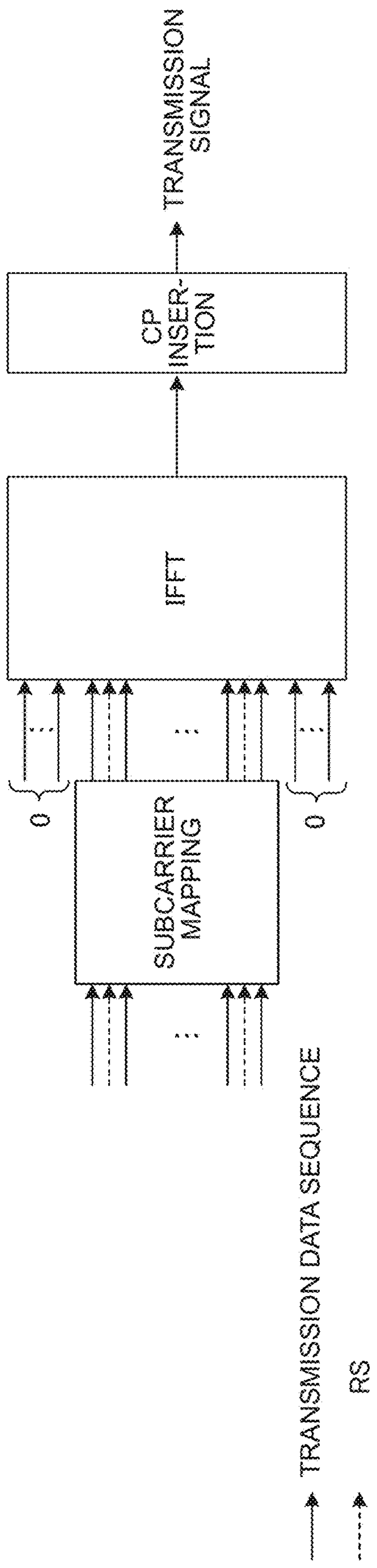

FIGS. 5A and 5B are diagrams illustrating an example of a transmission block of DFT-s-OFDM and CP-OFDM, respectively, according to the present embodiment. As illustrated in FIG. 5A, the DFT-s-OFDM has a function of performing DFT spreading (hereinafter, referred to as a “transform precoder”), and thus is different from the CP-OFDM illustrated in FIG. 5B. That is, DFT-s-OFDM is the CP-OFDM to which the transform precoder is applied. The transform precoder may be paraphrased as transform precoding, DFT precoder, DFT precoding, or the like.

As illustrated in FIG. 5A, in the DFT-s-OFDM, the transmission data sequence or RS after encoding and modulation is input to the DFT at M point, and is converted from the time region to the frequency region. The output from the DFT is mapped to M subcarriers, input to inverse fast Fourier transform (IFFT) at N point, and converted from the frequency region to the time region. The DFT may be replaced with a fast Fourier transform (FFT), and the IFFT may be replaced with an inverse discrete Fourier transform (IDFT).

Here, N>M, and the input information to the unused IFFT is set to zero. N may be equal to the number of subcarriers corresponding to a given frequency bandwidth (for example, the bandwidth of the BWP or the cell C). M may be the number of subcarriers corresponding to the transmission bandwidth. As a result, the output of the IFFT is a signal with a small instantaneous power fluctuation and the bandwidth of which depends on M. The output from the IFFT is subjected to parallel to series (P/S) conversion and to which a CP cyclic prefix (CP) is added. The CP is also referred to as a guard interval (GI). As described above, in DFT-s-OFDM, a signal having the characteristics of a single carrier is generated and transmitted with one symbol. The CP may be inserted before the P/S conversion with respect to the output from the IFFT.

As illustrated in FIG. 5B, in the CP-OFDM, the encoded and modulation-posted transmission data sequence and/or RS is mapped to the number of subcarriers equal to the transmission bandwidth and input to the IFFT. The input information to the IFFT that is not used is configured to zero. The output from the IFFT is P/S converted and a CP is inserted. As described above, since the CP-OFDM uses the multi-carrier, the RS and the transmission data sequence can be frequency-divided and pluralized. Of course, the transmission data sequence may be transmitted without frequency-dividing pluralizing with the RS.

As described above, since the characteristics of DFT-s-OFDM and CP-OFDM are in a trade-off relationship, it is desirable to switch DFT-s-OFDM and CP-OFDM according to various parameters (for example, cell load, scheduling status, antenna state, and the like). DFT-s-OFDM and CP-OFDM are switched depending on whether or not a transform precoder is applied, as described in FIGS. 5A and 5B.

By the way, switching of DFT-s-OFDM and CP-OFDM is predicted to be performed by using RRC signaling. For example, in releases 15 and 16 of the 3GPP, at least one of the SIB1, the RRC set-up message, the RRC re-establishment message, the RRC resume message, and the RRC reconfiguration message includes RRC parameter regarding the transform precoder (for example, at least one of RRC IE "transformPrecoder", "msg3-transformPrecoder", "transformPrecoderDisabled", and "transformPrecoderEnabled", so that the waveform of the uplink signal (for example, PUSCH and/or PTRS) is switched between DFT-s-OFDM and CP-OFDM.

As described above, in releases 15 and 16, mainly in the initially access, it is predicted that the waveform of the uplink signal is switched by using the RRC message transmitted from the base station 20 to the terminal 10 when transitioning from the idle state or the inactive state to the connected state. In releases 15 and 16, when switching the waveform of the uplink signal of the terminal 10 already in the connected state, the RRC reconfiguration message transmitted from the base station 20 to the terminal 10 is used. However, a case where the RRC signaling is used, a processing delay (for example, several tens of msec) from receiving the RRC signaling to applying the received parameter is longer and an amount of signaling is larger as compared with those of a case where signaling of a layer lower than the RRC layer is used. Therefore, there is a concern that the waveform of the uplink signal cannot be switched at an appropriate timing according to the wireless situation.

Therefore, in the present embodiment, by including information regarding the transform precoder for the uplink signal (hereinafter, referred to as "transform precoder information") in the signaling (for example, physical layer signaling or MAC signaling) lower than the RRC signaling, the waveform of the uplink signal is switched at a flexible timing determined by the network. Specifically, an operation (first switching operation) related to switching of the waveform of the uplink signal based on the transform precoder information included in the DCI, and an operation (second switching operation) related to switching of the waveform of the uplink signal based on the MAC control element (MAC CE) transform precoder information will be described.

Here, even if the transform precoder information may be, for example, information indicating whether or not to apply the transform precoder to the uplink signal (hereinafter, "transform precoder indicator (TPI)"). Whether or not to apply the transform precoder may be paraphrased as whether or not the transform precoder is enabled, or whether or not the transform precoder is activated, and the like. Hereinafter, TPI will be described as an example of the transform precoder information, but the transform precoder information is not limited to this. In the following, the TPI may be paraphrased into any information regarding the transform precoder.

In addition, the uplink signal whose waveform is determined based on the TPI is, for example, at least one of the PUSCH and the uplink PTRS. Hereinafter, the switching of the waveform of the PUSCH will be described, but the present invention is not limited to this, and the switching of the waveform of the present embodiment may be applied to the uplink signal (for example, PTRS or the like) other than the PUSCH. In addition, the switching of the waveform of the present embodiment is not limited to the uplink signal, and may be applied to other signals (for example, a sidelink signal and the like).

First Switching Operation

In the first switching operation, the terminal 10 determines whether or not to apply the transform precoder to the PUSCH based on the TPI in the DCI. That is, the terminal 10 determines whether a waveform of DFT-s-OFDM (apply the transform precoder) or CP-OFDM (not apply the transform precoder) is applied to the PUSCH based on the TPI in the DCI.

In the following, as an example of the DCI including the TPI, the DCI (for example, DCI format 1_0) used in a random access procedure on the PDCCH order, that is, the DCI including information regarding a random access preamble (hereinafter, referred to as "random access preamble information") will be described, but the present invention is not limited to this. The DCI including the TPI may be a DCI (for example, also referred to as DCI format 0_x (x=0, 1, . . . ), UL grant or uplink grant), or another DCI (for example, DCI format 2_x (x=0, 1, . . . )) which is used for scheduling of the PUSCH.

Figure 6:
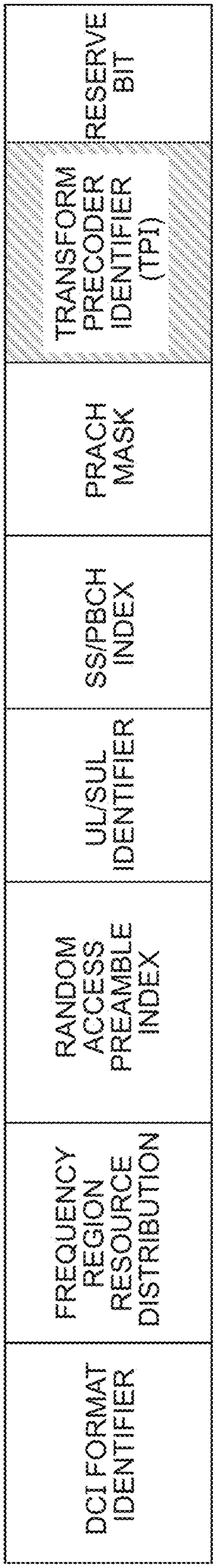
FIG. 6 is a diagram illustrating an example of a DCI including a TPI according to the present embodiment.

FIG. 6 is a diagram illustrating an example of the DCI including the TPI according to the present embodiment. FIG. 6 illustrates the DCI for the random access procedure started on the PDCCH order. The terminal 10 may determine whether or not the DCI is for the random access procedure started on the PDCCH order, based on a value of a specific field of the DCI. In addition, when a specific field in the DCI has a given value, the terminal 10 may determine that the TPI field is included in a field other than the specific field in the DCI.

For example, in FIG. 6, when all the bit of the frequency region resource distribution field of the DCI format 1_0 is "1", the terminal 10 determines that the DCI format 1_0 is for the random access procedure started in the PDCCH order. That is, when all the bit of the frequency region resource distribution field of the DCI format 1_0 is "1", the terminal 10 determines that the remaining bits are the random access preamble index field, the Uplink/Supplementary Uplink (IL/SUL) identifier field, the SS/PBCH field, the TPI field, and the reserved bit. At least one field other than the TPI field illustrated in FIG. 6 may be omitted or reserved.

A value of the random access preamble index field indicates random access preamble information (for example, the random access preamble index). The terminal 10 transmits the random access preamble determined based on the random access preamble information in the CFRA.

The value of the UL/SUL identifier field indicates whether the uplink carrier that transmits the PRACH (that is, the random access preamble) is the SUL or the normal UL when the SUL is configured. The SUL is the uplink carrier for which the corresponding downlink carrier does not exist.

The value of the SS/PBCH index field indicates the SS/PBCH for determining a resource (hereinafter, referred to as "RACH occasion") in the time region and/or frequency region for transmitting the PRACH (that is, the random access preamble). Each RACH occasion is associated with at least one SS/PBCH. The value of the PRACH mask field indicates the RACH occasion associated with the SS/PBCH.

The value of the TPI field indicates whether or not to apply the transform precoder. For example, the TPI value "0" may indicate that the transform precoder is not applied to the uplink signal (that is, disabled), and the TPI value "1" may indicate that the transform precoder is applied to the uplink signal (that is, enabled). In the case of the type 1 CFRA, the TPI value "1" may indicate that the transform precoder is enabled when the random access procedure started on the PDCCH order is completed (that is, when the RAR is received), and the TPI value "0" may indicate that the transform precoder is disabled when the random access procedure started on the PDCCH order is completed. In the case of the type 2 CFRA, the TPI value "1" may indicate that the transform precoder is enabled from the PUSCH in the message A, and the TPI value "0" may indicate that the transform precoder is disabled from the PUSCH in the message A.

First Example

In the first example, in a case where the type 1 CFRA is started by the DCI of the PDCCH order, the terminal 10 determines whether or not to apply the transform precoder to the PUSCH scheduled by a specific DCI (for example, also referred to as DCI format (DF) 0_x (x=0, 1, 2, . . . ), "UL grant") based on the TPI in the DCI of the PDCCH order.

Note that DF0_0 does not depend on the function configured in the terminal 10 and may be used for the schedule of the PUSCH of one cell. For example, DF0_0 may be used for scheduling of PUSCH in a case where scheduling is performed during execution of RRC reconfiguration, or in a case where it is unknown at what timing the function/parameter of the terminal 10 is changed by RRC reconfiguration. DF0_1 may be used for scheduling of one or a plurality of PUSCHs in one cell, or may indicate downlink feedback information of a cell group with respect to the terminal 10. DF0_1 may include fields having a variable size corresponding to the functions configured in the terminal 10. For example, when a carrier aggregation is configured in the terminal 10 and the cross carrier scheduling is performed, a carrier indicator field indicating a carrier to which the PUSCH is scheduled may be included, and the DF0_2 is the DCI for use in Ultra-Reliable and Low Latency Communications (URLLC) and may be used for scheduling of the PUSCH of one cell. The size of DF0_2 may be smaller than that of DF0_1.

FIG. 7 is a diagram illustrating the first example of the first switching operation according to the present embodiment. In FIG. 7, the waveform of the PUSCH is switched using the type 1 CFRA started by the DCI on the PDCCH order. In FIG. 7, the terminal 10 is in the connected state, and RRC parameters related to the application of the transform precoder to the message 3 or PUSCH (for example, "transform Precoder" in RRC IE "msg3-transformPrecoder" or RRC IE "pusch-Config") are configured.

As illustrated in FIG. 7, in step S101, the terminal 10 detects the CRC-scrambled DCI (for example, DCI format (DF) 0_x) with a specific RNTI by monitoring the PDCCH. The specific RNTI may be, for example, Configured Scheduling RNTI (CS-RNTI), Cell RNTI (C-RNTI), Modification and Coding Scheme-C-RNTI (MCS-C-RNTI), or Semi-Persistent Channel State Information RNTI (SP-CSI-RNTI). The CS-RNTI is an identifier of the terminal 10 for a configured grant, and may be a new data identifier (NDI)=1 in the CRC-scrambled DCI in the CS-RNTI. DF0_x, which is CRC-scrambled in the CS-RNTI and has NDI=1, may be regarded as a DCI (that is, a dynamic uplink grant) that dynamically schedules the PUSCH. On the other hand, DF0_x, which is CRC-scrambled in CS-RNTI and has NDI=0, may be regarded as a configured grant. C-RNTI is used as an identifier of the RRC connection and may be an identifier of the terminal 10 for scheduling. MCS-C-RNTI may be an identifier of the terminal 10 used to indicate an alternative MCS table for the PDSCH and PUSCH. SP-CSI-RNTI may be an identifier of the terminal 10 used for broadcasting semi-persistent channel state information (SP-CSI) on the PUSCH.

In step S102, the terminal 10 determines whether or not to apply the transform precoder to the scheduled PUSCH by using the DCI of step S101 based on the RRC parameter related to the configured transform precoder (for example, "transform Precoder" in RRC IE "msg3-transformPrecoder" or RRC IE "pusch-Config"). In FIG. 7, for example, since the "transformPrecoder" in RRC IE "msg3-transformPrecoder" or RRC IE "pusch-Config") is configured to enable, the terminal 10 (that is, the DFT) applies the transform precoder (that is, DFT-s-OFDM) to transmit the PUSCH.

In step S103, the random access procedure of the PDCCH order is started, and the terminal 10 is CRC-scrambled by a specific RNTI (for example, C-RNTI), and detects the DCI (for example, DCI format 1_0) in which a specific field (for example, a frequency region resource distribution field) is configured to a specific value (for example, all 1). As illustrated in FIG. 6, the DCI may include the random access preamble index and the TPI. In step S104, the terminal 10 transmits the random access preamble determined based on the random access preamble field value in the DCI via the PRACH.

In step S105, the terminal 10 detects the DCI (for example, DCI format 1_0) that is CRC-scrambled by a specific RNTI (for example, Random Access RNTI (RA-RNTI)) by monitoring the PDCCH. In step S106, the terminal 10 receives the random access response via the PDSCH scheduled using the DCI. The type 1 CFRA is completed by receiving the random access response.

In step S107, the terminal 10 detects the DCI (for example, DCI format 0_x) CRC-scrambled at a specific RNTI (for example, CS-RNTI, C-RNTI, MCS-C-RNTI, or SP-CSI-RNTI) by monitoring the PDCCH after the completion of the type 1 CFRA. In step S108, the terminal 10 determines whether or not to apply the transform precoder to the PUSCH that is scheduled using the DCI in step S107 based on the TPI in the DCI detected in step S103, rather than the preconfigured RRC parameter (for example, RRC IE "msg3-transformPrecoder"). In FIG. 7, for example, since the TPI=0, the terminal 10 transmits the PUSCH without applying the transform precoder (that is, using CP-OFDM).

As described above, for example, in FIG. 7, for the PUSCH transmission scheduled by the PDCCH that is CRC-scrambled with a specific RNTI (for example, CS-RNTI, C-RNTI, MCS-C-RNTI, or SP-CSI-RNTI with NDI=1):

- when the DCI having the scheduling is received in the DCI format 0_0,
- when the transform precoder is enabled or disabled by receiving the TPI via the DCI format 1_0, the terminal 10 may determine whether the transform precoding is enabled or disabled for the PUSCH transmission according to the TPI.

when the TPI is not received via the DCI format 1_0, the terminal 10 may determine whether the transform precoding is enabled or disabled for the PUSCH transmission according to the RRC parameter (for example, RRC IE "msg3-transformPrecoder").

when the DCI having the scheduling is not received in the DCI format 0_0 (for example, when it is received in the DCI format 0_1 or the DCI format 0_2), when the transform precoder is enabled or disabled by receiving the TPI via the DCI format 1_0, the terminal 10 may determine whether the transform precoding is enabled or disabled for the PUSCH transmission according to the TPI.

when the TPI is not received via the DCI format 1_0, and the RRC parameter (for example, the RRC IE "transformPrecoder") related to the transform precoder is configured in the PUSCH configuring information (for example, RRC IE "pusch-Config"), the terminal 10 may determine whether the transform precoder for the PUSCH transmission is enabled or disabled according to the RRC parameter.

when the TPI is not received via the DCI format 1_0 and the RRC parameter (for example, RRC IE "transformPrecoder" related to the transform precoder is not configured in the PUSCH configuring information (for example, RRC IE "pusch-Config"), the terminal 10 may determine whether the transform precoder for the PUSCH transmission is enabled or disabled according to another RRC parameter (for example, RRC IE "msg3-transformPrecoder") related to the transform precoder.

Second Example

In the second example, in a case where the type 1 CFRA is started by the DCI of the PDCCH order, the terminal 10 determines whether or not to apply the transform precoder to the PUSCH based on the configured grant, based on the TPI in the DCI of the PDCCH order.

Here, the configured grant is scheduling information that is persistent or semi-persistent based on the RRC parameter (for example, RRC IE "ConfiguredGrantConfig")). In The type 1 configured grant, the PUSCH of a given cycle is scheduled based on the UL grant "rrc-configureduplinkGrant" in the RRC parameter (for example, RRC IE "ConfiguredGrantConfig")) without using the DCI. In the type 2 configured grant, the PUSCH of a given cycle is activated using the DCI based on the RRC IE "ConfiguredGrantConfig" that does not include the RRC parameter (for example, the UL grant "rrc-configureduplinkGrant").

FIG. 8 is a diagram illustrating the second example of the first switching operation according to the present embodiment. FIG. 8 is different from FIG. 7 in that the PUSCH is transmitted at a given cycle based on the configured grant. Below, differences from FIG. 7 will be mainly described. In FIG. 8, the terminal 10 is in the connected state, and the RRC parameter related to the application of the PUSCH transform precoder (for example, the "transformPrecoder" in the RRC IE "msg3-transformPrecoder" or the RRC IE "ConfiguredGrantConfig") is configured based on the message 3 or the configured grant.

In step S201, the terminal 10 determines whether or not to apply the transform precoder to the PUSCH of a given cycle based on the configured grant, based on the RRC parameter related to the application of the transform precoder. In FIG. 8, for example, since the "transformPrecoder" in the RRC IE "msg3-transformPrecoder" or the RRC IE "ConfiguredGrantConfig") is configured to enable, the terminal 10 applies the transform precoder (that is, using DFT-s-OFDM) and transmits the PUSCH at a given cycle.

Steps S202 to S205 are the same as steps S103 to S106 of FIG. 7. In step S206, the terminal 10 determines whether or not to apply the transform precoder to the PUSCH of a given cycle based on the configured grant, based on the TPI in the DCI detected in step S202, instead of the configured RRC parameter described above. In FIG. 8, for example, since the TPI=0, the terminal 10 transmits the PUSCH without applying the transform precoder (that is, using CP-OFDM).

As described above, for example, in FIG. 8, regarding the PUSCH transmission having the configured grant:

when the transform precoder is enabled or disabled by receiving the TPI via the DCI format 1_0, the terminal 10 may determine whether the transform precoding is enabled or disabled for the PUSCH transmission according to the TPI.

when the TPI is not received via the DCI format 1_0 and the RRC parameter related to the transform precoder (for example, RRC IE "transform Precoder") is configured in the RRC parameter related to the configured grant (for example, the RRC IE "configuredGrantConfig"), the terminal 10 may determine whether the transform precoder for the PUSCH transmission is enabled or disabled according to the RRC parameter.

when the TPI is not received via the DCI format 1_0 and the RRC parameter related to the transform precoder (for example, RRC IE "transformPrecoder") is not configured in the RRC parameter related to the configured grant (for example, the RRC IE "configuredGrantConfig"), the terminal 10 may determine whether the transform precoder for the PUSCH transmission is enabled or disabled according to the RRC parameter (for example, RRC IE "msg3-transformPrecoder" related to the transform precoder of the message 3.

Third Example

In the third example, in a case where the type 2 CFRA is started by the DCI of the PDCCH order, the terminal 10 determines whether or not to apply the transform precoder to the PUSCH as the message A based on the TPI in the DCI of the PDCCH order.

FIG. 9 is a diagram illustrating the third example of the first switching operation according to the present embodiment. FIG. 9 is different from FIGS. 7 and 8 in that the waveform of the PUSCH is switched using the type 2 CFRA started by the DCI of the PDCCH order. Below, differences from FIG. 7 will be mainly described. In FIG. 9, the terminal 10 is in the connected state, and the RRC parameter related to the application of the transform precoder of the message A or the message 3 (for example, RRC IE "msgA-TransformPrecoder" or RRC IE "msg3-transformPrecoder") is configured.

Steps S301 to S303 are the same as steps S101 to S103 of FIG. 7. In step S304, the terminal 10 transmits the PRACH and the PUSCH as the message A. Specifically, the terminal 10 transmits the random access preamble determined based on the DCI in step S303 via the PRACH, and transmits the PUSCH based on the RRC parameter related to configuring of the PUSCH as the message A (for example, RRC IE "MsgA-PUSCH-Config"). In addition, the terminal 10 determines whether or not the transform precoder is applied to the PUSCH based on the TPI in the DCI detected in step S303. In FIG. 9, for example, since the TPI=0, the terminal 10 transmits the PUSCH without applying the transform precoder (that is, using CP-OFDM).

In step S305, the terminal 10 detects the DCI (for example, DCI format 1_0) CRC-scrambled by a specific RNTI (for example, RA-RNTI) by monitoring the PDCCH. In step S306, the terminal 10 receives the random access response (message B) via the PDSCH scheduled using the DCI.

As described above, for example, in FIG. 9, for the PUSCH as the message A:

- when the transform precoder is enabled or disabled by receiving the TPI via the DCI format 1_0, the terminal 10 may determine whether the transform precoding is enabled or disabled for the PUSCH transmission according to the TPI.
- when the TPI is not received via the DCI format 1_0 and the RRC parameter related to the application of the transform precoder of the message A (for example, RRC IE "msgA-TransformPrecoder") is not configured, the terminal 10 may determine whether the transform precoder for the PUSCH transmission is enabled or disabled according to the RRC parameter. When the RRC parameter is not configured, the terminal 10 may determine whether the transform precoder for the PUSCH transmission is enabled or disabled according to the RRC parameter related to the transform precoder of the message 3 (for example, RRC IE "msg3-transformPrecoder").

Fourth Example

In the fourth example, in a case where the type 1 or type 2 CFRA started by the DCI of the PDCCH order fails, the terminal 10 determines whether or not to apply the transform precoder to the PUSCH based on the RRC parameter related to the application of the transform precoder or the application state of the transform precoder before the execution of the CFRA instead of the DCI of the PDCCH order. Here, the case where the type 1 or type 2 CFRA fails is, for example, a case where the random access response cannot be received by the expiration of a given timer or window (for example, ra-ResponseWindow), and a case where the RACH retransmission is performed and the defined number of retransmissions (for example, preambleTransMax) is reached.

Figure 10:
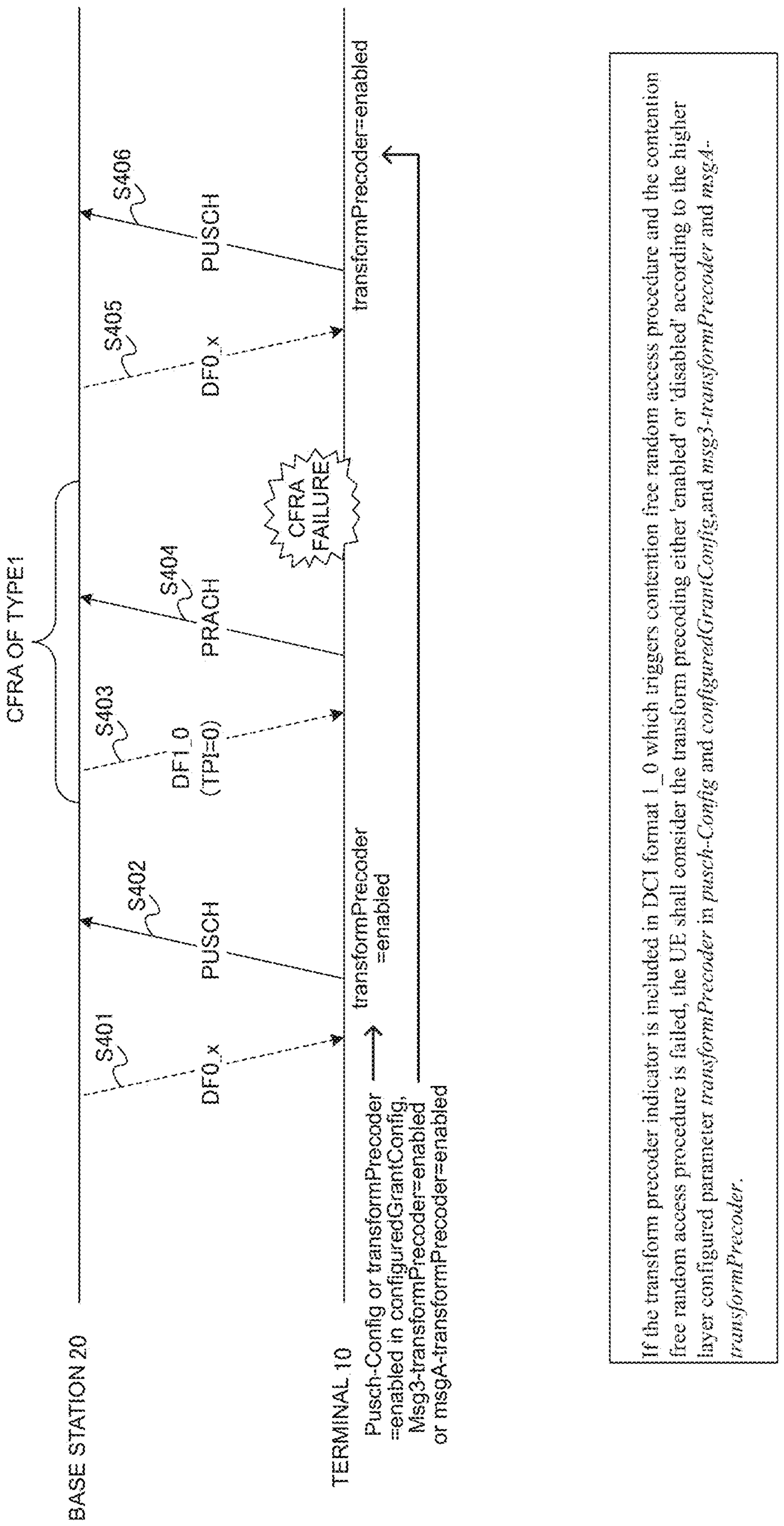
FIG. 10 is a diagram illustrating a fourth example of the first switching operation according to the present embodiment.

FIG. 10 is a diagram illustrating the fourth example of the first switching operation according to the present embodiment. FIG. 10 describes a case where the type 1 CFRA fails, focusing on the difference from FIG. 7, but even in the case where the type 1 CFRA illustrated in FIG. 8 fails and the case where the type 2 CFRA illustrated in FIG. 9 fails, the present embodiment can be appropriately applied. Steps S401 to S404 and S405 of FIG. 10 are the same as steps S101 to S104 and S107 of FIG. 7.

As illustrated in FIG. 10, when the CFRA started by the DCI of the PDCCH order fails, in step S406, the terminal 10 determines whether or not to apply the transform precoder to the PUSCH based on the RRC parameter related to the application of the transform precoder (for example, "transform Precoder" in the RRC IE "pusch-Config" or "configuredGrantConfig", the RRC IE "msg3-transformPrecoder", or the RRC IE "msgA-transform Precoder"). In FIG. 10, for example, the RRC parameter is configured to be enabled, so the terminal 10 transmits the PUSCH by applying the transform precoder (that is, using DFT-s-OFDM).

As described above, for example, in FIG. 10, when the TPI is included in the DCI (for example, DCI format 1_0) that triggers the CFRA and the CFRA fails, the terminal 10 may determine whether to enable or disable the transform precoder for the PUSCH transmission according to the RRC parameter related to the application of the transform precoder (for example, "transformPrecoder" in the RRC IE "pusch-Config" or "configuredGrantConfig", RRC IE "msg3-transformPrecoder", or RRC IE "msgA-transformPrecoder").

Fifth Example

In the fifth example, in the type 2 CFRA started by the DCI of the PDCCH order, when the terminal 10 receives a fallback indication to type 1, the terminal 10 switches the PUSCH waveform based on preconfigured RRC parameter or the application state of the transform precoder before execution of the CFRA instead of the DCI of the PDCCH order.

Figure 11:
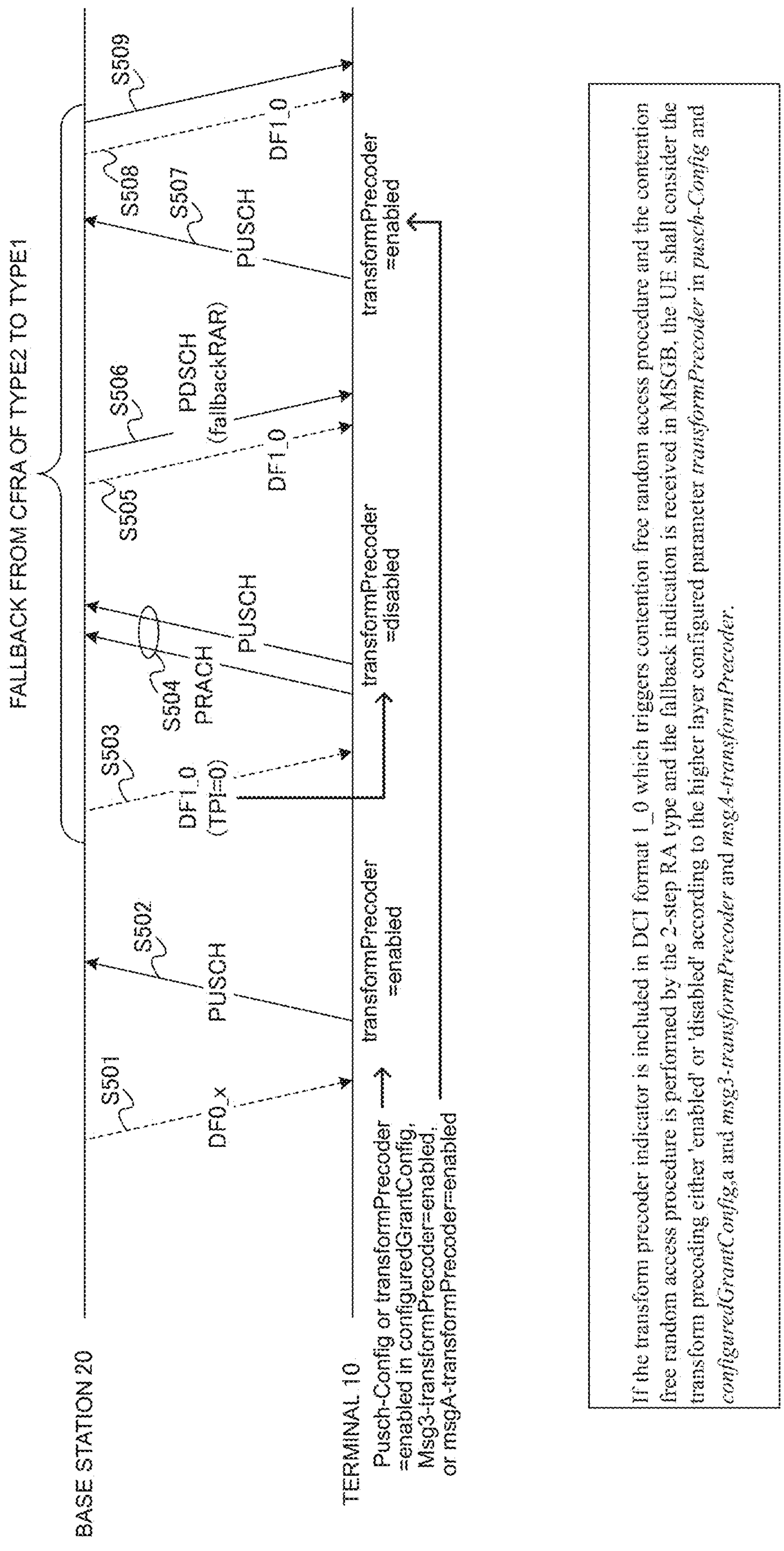
FIG. 11 is a diagram illustrating a fifth example of the first switching operation according to the present embodiment.

FIG. 11 is a diagram illustrating the fifth example of the first switching operation according to the present embodiment. FIG. 11 describes a case of falling back from type 2 to type 1 random access procedure focusing on the difference from FIG. 9. Steps S501 to S505 of FIG. 11 are the same as steps S301 to S305 of FIG. 9.

As illustrated in FIG. 11, in step S506, the terminal 10 receives a fallback random access response (fallback RAR) via the PDSCH scheduled by the DCI in step S505.

In step S507, the terminal 10 transmits the PUSCH (message 3) based on the UL grant in the fallback RAR (also referred to as "fallback RAR UL grant") in step S506. The terminal 10 determines whether or not to apply the transform precoder to the PUSCH based on the RRC parameter related to the application of the transform precoder (for example, "transformPrecoder" in the RRC IE "pusch-Config" or "configuredGrantConfig", RRC IE "msg3-transformPrecoder", or the RRC IE "msgA-transformPrecoder") rather than the TPI in the DCI of the PDCCH order detected in step S503. In FIG. 11, for example, since the RRC parameter is configured to be enabled, the terminal 10 applies the transform precoder (that is, using DFT-s-OFDM) and transmits the PUSCH.

In step S508, the terminal 10 detects the DCI (for example, DCI format 1_0) CRC-scrambled by a specific RNTI (for example, the RA-RNTI) by monitoring the PDCCH. In step S509, the terminal 10 receives the contention resolution message (message 4) via the PDSCH scheduled using the DCI.

As described above, for example, in FIG. 11, when the TPI is included in the DCI that triggers the CFRA (for example, DCI format 1_0), type 2 CFRA is implemented, and the fallback instruction to type 1 is received in the message B, the terminal 10 may determine whether to enable or disable the transform precoder for the PUSCH transmission according to the RRC parameter related to the application of the transform precoder (for example, "transformPrecoder" in the RRC IE "pusch-Config" or "configuredGrantConfig", RRC IE "msg3-transformPrecoder", or RRC IE "msgA-transformPrecoder").

Sixth Example

In the sixth example, the terminal 10 may also determine whether or not to apply the transform precoder to the PUSCH scheduled to a specific DCI (for example, the DCI format 0_0) that is CRC-scrambled by a specific RNTI (for example, the TC-RNTI) based on the TPI in the DCI of the PDCCH order. The PUSCH scheduled by the DCI format 0_0 that is CRC-scrambled by the TC-RNTI may be, for example, the PUSCH scheduled when retransmission of the message 3 is requested. Further, the terminal 10 may determine whether or not to apply the transform precoder to the PUSCH scheduled by the RAR UL grant, based on the TPI in the DCI of the PDCCH order.

As described above, for example, for the PUSCH scheduled by the UL grant in the RAR, the PUSCH scheduled by the UL grant in the fallback RAR, or the PUSCH scheduled by the DCI format 0_0 CRC-scrambled by TC-RNTI:

- when the transform precoder is enabled or disabled by receiving the TPI via the DCI format 1_0, the terminal 10 may determine whether the transform precoding is enabled or disabled for the PUSCH transmission according to the TPI.
- when the TPI is not received via the DCI format 1_0, the terminal 10 may determine whether the transform precoder is enabled or disabled for the PUSCH transmission according to the RRC parameter (for example, RRC IE "msg3-transformPrecoder") related to the transform precoder of the message 3.

As described above, according to the first switching operation, since the DCI includes the TPI, the terminal 10 can flexibly switch whether or not to apply the transform precoder at an appropriate timing determined by the network. For example, by including the TPI in the DCI of the PDCCH order that triggers the CFRA, the network side can flexibly switch the PUSCH waveform.

Second Switching Operation

In the second switching operation, the terminal 10 determines whether or not to apply the transform precoder to the PUSCH based on the TPI in the MAC control element (MAC CE). That is, the terminal 10 determines which waveform to use for the PUSCH, the DFT-s-OFDM (applying transform precoder) or the CP-OFDM (not applying transform precoder), based on the TPI in the MAC CE. The second switching operation will be described mainly focusing on the differences from the first switching operation.

FIG. 12 is a diagram illustrating an example of the MAC CE including the TPI according to the present embodiment. For example, the MAC CE illustrated in FIG. 12 includes an A/D field, a serving cell ID field, a BWP ID field, a SUL field, a TPI field, and a reserve bit. At least one field other than the TPI field illustrated in FIG. 12 may be omitted or reserved. The constitution of the MAC CE illustrated in FIG. 12 is merely an example, and the position of each field, the bit number, and the like are not limited to what is illustrated in the drawing.

The A/D field is a field indicating whether to activate or deactivate a resource set for a Semi-Persistent Zero Power Channel State Information Reference Signal (SP-ZP-CSI-RS). For example, it may be illustrated that a value of "1" in the field indicates that the resource set is activated, and a value of "0" in the field indicates that the resource set is deactivated.

The serving cell ID field is a field indicating the identifier of the serving cell ID to which the MAC CE is applied. The field may be configured with a given number of bits (for example, 5 bits). The BWP ID field is a field indicating the downlink BWP to which the MAC CE is applied. The downlink BWP may be indicated by the code point of the bandwidth partial identifier field in the DCI. The BWP ID field may be constituted with a given number of bites (for example, 2 bits).

The SURE field is a field indicating whether the MAC CE is applied to a normal uplink carrier (NUL) or SUL. It may be illustrated that the value of "1" in the field indicates that the MAC CE is applied to the SUL, and the value of "0" in the field indicates that the MAC CE is applied to the NUL.

The TPI field is a field indicating whether the transform precoder is enabled or disabled. It may be illustrated that the value of "1" in the field indicates that the transform precoder is to be enabled, and the value of "0" in the field indicates that the transform precoder is to be disabled.

First Example

In the first example, the terminal 10 determines whether or not to apply the transform precoder to the PUSCH scheduled by a specific DCI (for example, DCI format 0_x) based on the TPI in the MAC CE.

FIG. 13 is a diagram illustrating the first example of the second switching operation according to the present embodiment. FIG. 13 is different from FIG. 7 in that the TPI is included in the MAC CE instead of the DCI of the PDCCH order that starts the type 1 CFRA. Below, differences from FIG. 7 will be mainly described. Steps S601 and S602 of FIG. 13 are the same as steps S101 and S102 of FIG. 7.

In step S603, by monitoring the PDCCH, the terminal 10 detects the DCI (for example, DCI format 1_x (x=1, 2, 3 . . . ), also called "DL assignment") that is CRC-scrambled by a specific RNTI (for example, C-RNTI). In step S604, the terminal 10 receives the MAC CE including the TPI via the PDSCH scheduled by the DCI in step S603.

In step S605, by monitoring the PDCCH, the terminal 10 detects the DCI (for example, DCI format 0_x) that is CRC-scrambled by a specific RNTI (for example, CS-RNTI, C-RNTI, MCS-C-RNTI, or SP-CSI-RNTI with NDI=1). In step S606, the terminal 10 determines whether or not to apply the transform precoder to the PUSCH scheduled using the DCI in step S605, based on the TPI in the MAC CE received in step S604, rather than the RRC parameter related to the transform precoder. In No. 13, for example, since the TPI=0 in the MAC CE, the terminal 10 transmits the PUSCH without applying the transform precoder (that is, using the CP-OFDM).

As described above, for example, in FIG. 13, for PUSCH transmission scheduled by the PDCCH that is CRC-scrambled by a specific RNTI (for example, CS-RNTI, C-RNTI, MCS-C-RNTI, or SP-CSI-RNTI with NDI=1):

- when the DCI having the scheduling is received in the DCI format 0_0,
- when the transform precoder is enabled or disabled by receiving the TPI via the MAC CE that activates or deactivates the transform precoder, the terminal 10 may determine whether the transform precoding is enabled or disabled for the PUSCH transmission according to the TPI.
- when the TPI is not received via the MAC CE, the terminal 10 may determine whether the transform precoding is enabled or disabled for the PUSCH transmission according to the RRC parameter (for example, RRC IE "msg3-transformPrecoder")).
- when the DCI having the scheduling is not received in the DCI format 0_0 (for example, when it is received in the DCI format 0_1 or the DCI format 0_2),
- when the transform precoder is enabled or disabled by receiving the TPI via the MAC CE that activates or deactivates the transform precoder, the terminal 10 may determine whether the transform precoding is enabled or disabled for the PUSCH transmission according to the TPI.
- when the TPI is not received via the MAC CE and the RRC parameter (for example, the RRC IE "transform Precoder") related to the transform precoder in the configuring information of the PUSCH (for example, the RRC IE "pusch-Config") is configured, the terminal 10 may determine whether the transform precoder for the PUSCH transmission is enabled or disabled according to the RRC parameter.

when the TPI is not received via the MAC CE and the RRC parameter (for example, the RRC IE "transform Precoder") related to the transform precoder in the configuring information of the PUSCH (for example, the RRC IE "pusch-Config") is not configured, the terminal 10 may determine whether the transform precoder for the PUSCH transmission is enabled or disabled according to another RRC parameter (for example, RRC IE "msg3-transformPrecoder") related to the transform precoder.

Second Example

In the second example, the terminal 10 determines whether or not to apply the transform precoder to the PUSCH based on the configured grant, based on the TPI in the MAC CE.

FIG. 14 is a diagram illustrating the second example of the second switching operation according to the present embodiment. FIG. 14 is different from FIG. 8 in that the TPI is included in the MAC CE instead of the DCI of the PDCCH order that starts the type 1 CFRA. Below, description will be made mainly focusing on the differences from FIGS. 8 and 13. Step S701 of FIG. 14 is the same as step S201 of FIG. 8. Steps S702 and S703 of FIG. 14 are the same as steps S603 and S604 of FIG. 13.

In step S704, the terminal 10 determines whether or not to apply the transform precoder to the PUSCH based on the configured grant, based on the TPI in the MAC CE received in step S703 instead of the RRC parameter related to the transform precoder (for example, RRC IE "msg3-transformPrecoder" or "transformPrecoder" in the RRC IE "ConfiguredGrantConfig"). In FIG. 14, for example, since the TPI=0 in the MAC CE, the terminal 10 transmits the PUSCH without applying the transform precoder (that is, using the CP-OFDM).

As described above, for example, in FIG. 14, for the PUSCH transmission having the configured grant:

when the transform precoder is enabled or disabled by receiving the TPI via the MAC CE that activates or deactivates the transform precoder, the terminal 10 may determine whether the transform precoding is enabled or disabled for the PUSCH transmission according to the TPI.

when the TPI is not received via the MAC CE and the RRC parameter related to the transform precoder (for example, RRC IE "transformPrecoder") is configured in the RRC parameter related to the configured grant (for example, the RRC IE "configuredGrantConfig"), the terminal 10 may determine whether the transform precoder for the PUSCH transmission is enabled or disabled according to the RRC parameter.

when the TPI is not received via the MAC CE and the RRC parameter related to the transform precoder (for example, RRC IE "transformPrecoder") is not configured in the RRC parameter related to the configured grant (for example, the RRC IE "configuredGrantConfig"), the terminal 10 may determine whether the transform precoder for the PUSCH transmission is enabled or disabled according to the RRC parameter related to the transform precoder of the message 3 (for example, RRC IE "msg3-transformPrecoder").

Third Example

In the third example, the terminal 10 determines whether or not to apply the transform precoder to the PUSCH as the message A based on the TPI in the MAC CE.

FIG. 15 is a diagram illustrating the third example of the second switching operation according to the present embodiment. FIG. 15 is different from FIG. 9 in that the TPI is included in the MAC CE instead of the DCI of the PDCCH order that starts the type 2 CFRA. Below, description will be made mainly focusing on the differences from FIGS. 9 and 13. Steps S801 and S802 of FIG. 15 are the same as steps S301 and S302 of FIG. 9. Steps S803 and S804 of FIG. 15 are the same as steps S603 and S604 of FIG. 13.

In step S805, the random access procedure of the PDCCH order is started, and the terminal 10 is CRC-scrambled by a specific RNTI (for example, C-RNTI), and detects the DCI (for example, DCI format 1_0) in which a specific field (for example, a frequency region resource distribution field) is configured to a specific value (for example, all 1).

In step S806, the terminal 10 transmits the PRACH and the PUSCH as the message A. Specifically, the terminal 10 transmits the random access preamble determined based on the DCI in step S805 via the PRACH, and transmits the PUSCH based on the RRC parameter related to the configuration of the PUSCH as the message A (for example, RRC IE "MsgA-PUSCH-Config"). Further, the terminal 10 determines whether or not to apply the transform precoder to the PUSCH based on the TPI in the MAC CE received in step S804. In FIG. 15, for example, since the TPI=0 in the MAC CE, the terminal 10 transmits the PUSCH without applying a transform precoder (that is, using CP-OFDM). Steps S807 and S808 of FIG. 15 are the same as steps S305 and S306 of FIG. 9.

As described above, for example, in FIG. 15, for the PUSCH as the message A:

when the transform precoder is enabled or disabled by receiving the TPI via the MAC CE that activates or deactivates the transform precoder, the terminal 10 may determine whether the transform precoding is enabled or disabled for the PUSCH transmission according to the TPI.

when the TPI is not received via the MAC CE and the RRC parameter related to the application of the transform precoder of the message A (for example, RRC IE "msgA-TransformPrecoder") is configured, the terminal 10 may determine whether the transform precoder for the PUSCH transmission is enabled or disabled according to the RRC parameter. When the RRC parameter is not configured, the terminal 10 may determine whether the transform precoder for the PUSCH transmission is enabled or disabled according to the RRC parameter related to the transform precoder of the message 3 (for example, RRC IE "msg3-transform Precoder").

Fourth Example

In the fourth example, the terminal 10 determines whether or not to apply the transform precoder to the PUSCH scheduled to a specific DCI (for example, DCI format 0_0) that is CRC-scrambled by a specific RNTI (for example, TC-RNTI) based on the TPI in the MAC CE.

As described above, for example, for the PUSCH scheduled by the UL grant in the RAR, the PUSCH scheduled by the UL grant in the fallback RAR, or the PUSCH scheduled by the DCI format 0_0 CRC-scrambled by TC-RNTI:

when the transform precoder is enabled or disabled by receiving the TPI via the MAC CE that activates or deactivates the transform precoder, the terminal 10 may determine whether the transform precoding is enabled or disabled for the PUSCH transmission according to the TPI.

in cases other than the above, whether to enable or disable the transform precoder for the PUSCH transmission may be determined according to the RRC parameter related to the transform precoder of the message 3 (for example, RRC IE "msg3-transformPrecoder").

As described above, according to the second switching operation, since the MAC CE includes the TPI, the terminal 10 can flexibly switch whether or not to apply the transform precoder at an appropriate timing determined by the network. For example, the network side can flexibly switch the PUSCH waveform without triggering the CFRA by the DCI of the PDCCH order.

Configuration of Wireless Communication System

Next will be described the configuration of each equipment in the wireless communication system 1. Note that the following configurations are intended to describe a necessary configuration in the description of the present embodiment and do not exclude each equipment from including a functional block other than those illustrated herein.

Hardware Configuration

Figure 16:
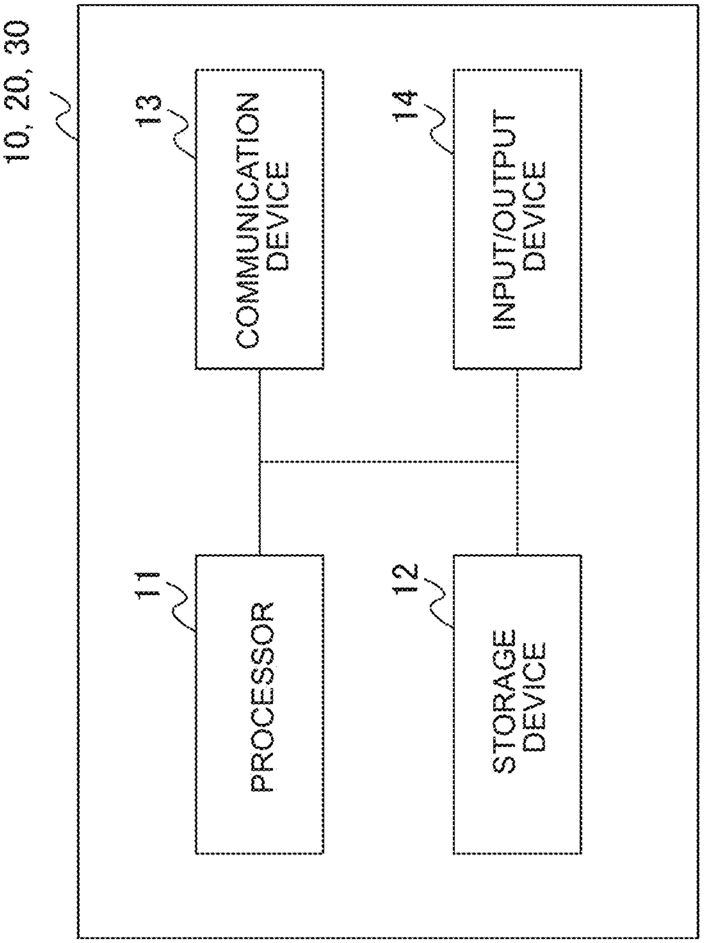
FIG. 16 is a diagram illustrating an example of a hardware configuration of each equipment in a wireless communication system according to the present embodiment.

FIG. 16 is a diagram illustrating an example of the hardware configuration of each equipment in the wireless communication system according to the present embodiment. Each equipment in the wireless communication system 1 (for example, the terminal 10, the base station 20, the CN 30, or the like) includes a processor 11, a storage device 12, a communication device 13 for performing wired or wireless communication, and an input/output device 14 for accepting various input operations and outputting various information.

The processor 11 is, for example, a CPU (Central Processing Unit) to control each equipment in the wireless communication system 1. The processor 11 may read a program from the storage device 12 and execute the program to perform various processing to be described in the present embodiment. Each equipment in the wireless communication system 1 may also be configured to include one or more processors 11. Further, each equipment concerned may also be called a computer.

The storage device 12 is constituted by, for example, storages such as a memory, an HDD (Hard Disk Drive), and/or an SSD (Solid State Drive). The storage device 12 may also store various information required to perform processing by the processor 11 (for example, programs and the like executed by the processor 11).

The communication device 13 is a device for performing communication through wired and/or wireless networks and may include a network card, a communication module, a chip, an antenna, and the like, for example. Further, an amplifier, an RF (Radio Frequency) device for performing processing on radio signals, and a BB (Base Band) device for performing processing on baseband signals may be included in the communication device 13.

The RF device performs D/A conversion, modulation, frequency conversion, power amplification, and the like on a digital baseband signal received from the BB device, for example, to generate a radio signal to be transmitted from an antenna. Further, the RF device performs frequency conversion, demodulation, A/D conversion, and the like on a radio signal received from the antenna to generate and transmit a digital baseband signal to the BB device.

The BB device performs processing of converting data into the digital baseband signal. Specifically, the BB device may map data to the subcarrier, perform the IFFT to generate the OFDM symbol, insert the CP into the generated OFDM symbol, and generate the digital baseband signal. The BB device may apply the transform precoder (DFT spreading) before mapping data to the subcarrier.

In addition, the BB device performs processing of converting the digital baseband signal into data. Specifically, the BB device may remove the CP from the digital baseband signal input from the RF device, perform the FFT on the signal from which the CP is removed, and extract the signal of the frequency region. The BB device may apply the IDFT to the signal in the frequency region.

The input/output device 14 includes input devices such as a keyboard, a touch panel, a mouse, and/or a microphone, and output devices such as a display and/or a speaker, for example.

Note that the hardware configuration described above is just an example. In each equipment inside the wireless communication system 1, part of the hardware illustrated in FIG. 16 may be omitted, or any other hardware unillustrated in FIG. 16 may be included. Further, the hardware illustrated in FIG. 16 may be constituted by one or more chips.

Functional Block Configuration

Terminal

Figure 17:
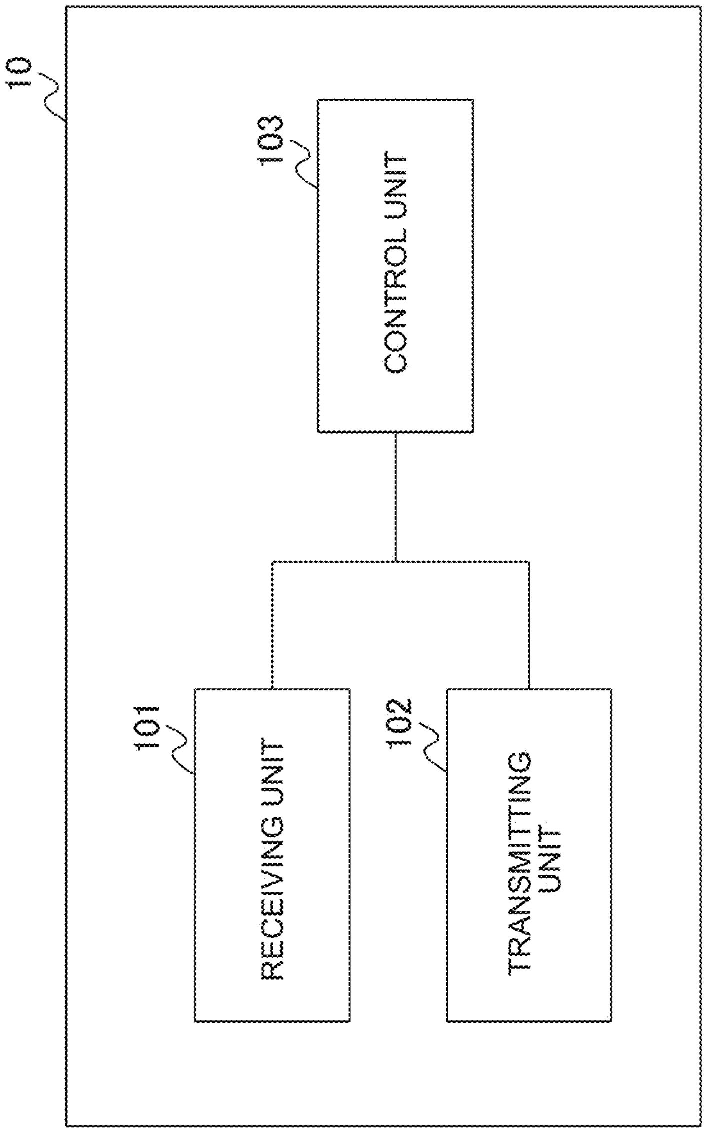
FIG. 17 is a diagram illustrating an example of the functional block configuration of a terminal according to the present embodiment.

FIG. 17 is a diagram illustrating an example of the functional configuration of the terminal according to the present embodiment. As illustrated in FIG. 17, the terminal 10 includes a receiving unit 101, a transmitting unit 102, and a control unit 103. The functional configuration illustrated in FIG. 17 is merely an example, and the functional division and functional unit may have any names as long as the operations according to the present embodiment can be executed. Further, the receiving unit 101 and the transmitting unit 102 may be collectively referred to as a communication unit.

All or some of the functions implemented by the receiving unit 101 and the transmitting unit 102 can be achieved by use of the communication device 13. Further, all or some of the functions implemented by the receiving unit 101 and the transmitting unit 102, and the control unit 103 can be achieved by the processor 11 executing a program stored in the storage device 12. Further, the program can be stored in a storage medium. The storage medium with the program stored thereon may be a non-transitory computer readable medium. The non-transitory medium is not limited particularly but may be a storage medium such as a USB memory or a CD-ROM, for example.

The receiving unit 101 receives a signal (for example, a downlink signal and/or a sidelink signal). Further, the receiving unit 101 may also receive information and/or data transferred through the signal. Here, for example, the verb "receive" may also include the meaning of performing processing related to reception including at least one of the reception, demapping, demodulation, decoding, monitoring, and measurement of a radio signal. The downlink signal may include, for example, at least one of PDCCH, PDSCH, a downlink reference signal, the synchronization signal, PBCH, and so on.

The receiving unit 101 monitors PDCCH candidates in a search space and detects DCI. The receiving unit 101 may receive the downlink data via the PDSCH scheduled using the DCI. The downlink data may include downlink user data and/or control information (for example, at least one parameter of a MAC layer, an RRC layer, and a Non Access Stratum (NAS) layer) of a higher layer. The receiving unit 101 may receive the system information via the PBCH and/or the PDSCH.

The transmitting unit 102 receives a signal (for example, an uplink signal and/or a sidelink signal). Further, the transmitting unit 102 may also transmit information and/or data to be transferred through the signal. Here, for example, the verb "transmit" may also include the meaning of performing processing related to transmission including at least one of encoding, modulation, mapping, and transmission of a radio signal. The uplink signal may include at least one including, for example, a PUSCH, PRACH, a physical uplink control channel (PUCCH), an uplink reference signal, or the like.

The transmitting unit 102 may transmit the uplink data via the PUSCH scheduled using the DCI received by the receiving unit 101. The uplink data may transmit uplink user data and/or control information (for example, at least one parameter of the MAC layer, the RRC layer, and the NAS layer) of the higher layer.

The control unit 103 performs various controls in the terminal 10. Specifically, the control unit 103 may control the operation of the terminal 10 based on information related to various configurations (for example, the parameters of the RRC layer) received by the receiving unit 101 from the base station 20 or other terminals 10. The operation of the terminal 10 based on the information may be synonymous with "configuration information is configured in the terminal 10".

The control unit 103 may control the reception of the signal in the receiving unit 101. Further, the control unit 103 may control the transmission of the signal in the transmitting unit 102. The control unit 103 may determine whether or not to apply the transform precoder to the signal transmitted by the transmitting unit 102.

In the present embodiment, the terminal 10 includes the transmitting unit 102 that transmits the uplink signal, the receiving unit 101 that receives downlink control information (DCI) including information related to the transform precoder or medium access control element (MAC CE), and the control unit 103 that determines whether or not to apply the transform precoder to the uplink signal based on the information related to the transform precoder.

The DCI may include information related to the random access preamble, and the transmitting unit 102 may transmit the random access preamble determined based on the information related to the random access preamble.

The uplink signal may be an uplink signal transmitted after the random access response to the random access preamble is received in the first type or second type random access procedure started based on the DCI.

The uplink signal may include the physical uplink shared channel (PUSCH) that is transmitted as the message A together with the random access preamble in the second type random access procedure started based on the DCI.

The receiving unit 101 may receive the RRC parameter related to the transform precoder, and the control unit 103 may determine whether or not to apply the transform precoder to the uplink signal according to the RRC parameter or the application state of the RRC parameter or the transform precoder before execution of the RRC parameter the failed random access procedure when the first type or second type random access procedure fails.

The receiving unit 101 may receive the RRC parameter related to the transform precoder, and the control unit 103 may determine whether or not to apply the transform precoder to the uplink signal according to the application state of the RRC parameter or the transform precoder before execution of the failed random access procedure when falling back from the second type random access procedure to the first type random access procedure.

Base Station

Figure 18:
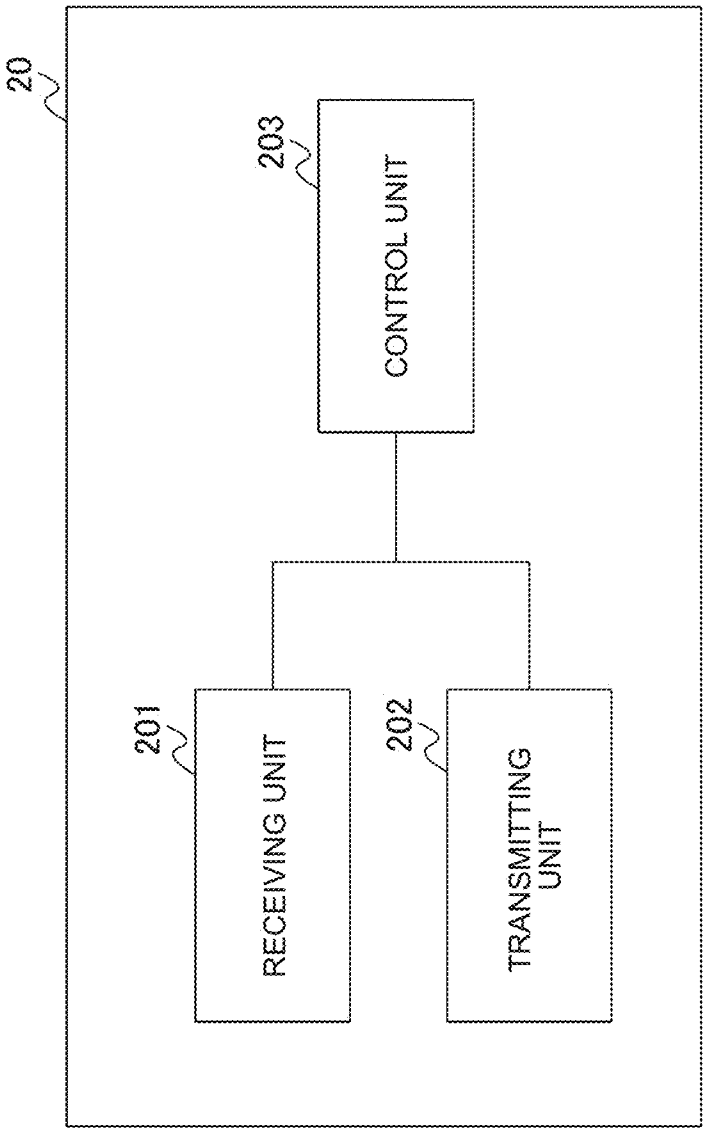
FIG. 18 is a diagram illustrating an example of the functional block configuration of a base station according to the present embodiment.

FIG. 18 is a diagram illustrating an example of the functional block configuration of the base station according to the present embodiment. As illustrated in FIG. 18, the base station 20 includes a receiving unit 201, a transmitting unit 202, and a control unit 203. The functional configuration illustrated in FIG. 18 is merely an example, and the functional division and functional unit may have any names as long as the operations according to the present embodiment can be executed. Further, the receiving unit 201 and the transmitting unit 202 may be collectively referred to as a communication unit.

All or some of the functions implemented by the receiving unit 201 and the transmitting unit 202 can be achieved by use of the communication device 13. Further, all or some of the functions implemented by the receiving unit 201 and the transmitting unit 202, and the control unit 203 can be achieved by the processor 11 executing a program stored in the storage device 12. Further, the program can be stored in a storage medium. The storage medium in which the program is stored may be a non-transitory computer readable medium. The non-transitory medium is not limited particularly but may be a storage medium such as a USB memory or a CD-ROM, for example.

The receiving unit 201 receives a signal (for example, an uplink signal and/or a sidelink signal). Further, the receiving unit 201 may also receive information and/or data (the uplink data) transferred through the signal.

The transmitting unit 202 transmits a signal (for example, a downlink signal and/or a sidelink signal). Further, the transmitting unit 202 may also transmit information and/or data to be transferred via the signal. Some of the information transmitted from the transmitting unit 202 may be transmitted by the transmitting unit within the core network device.

The control unit 203 performs various controls for communication with the terminal 10. Specifically, the control unit 203 may determine information related to various configurations (for example, parameters of the RRC layer) notified to the terminal 10. Transmitting the information to the terminal 10 may be synonymous with "the information is configured in the terminal 10".

The control unit 203 may control the reception of the signal in the receiving unit 201. Further, the control unit 203 may control the transmission of the signal in the transmitting unit 202.

In the present embodiment, the base station 20 includes the receiving unit 201 that receives the uplink signal, the transmitting unit 202 that transmits the downlink control information (DCI) including information related to the transform precoder or medium access control element (MAC CE), and the control unit 203 that generates information related to the transform precoder used for determining whether or not to apply the transform precoder to the uplink signal.

The DCI may include information related to the random access preamble, and the receiving unit 201 may receive the random access preamble determined based on the information related to the random access preamble.

The uplink signal may be an uplink signal transmitted after the random access response to the random access preamble is received in the first type or second type random access procedure started based on the DCI.

The uplink signal may include the physical uplink shared channel (PUSCH) that is transmitted as the message A together with the random access preamble in the second type random access procedure started based on the DCI.

The transmitting unit 202 may transmit the RRC parameter related to the transform precoder, and use the RRC parameter or the application state of the transform precoder before the execution of the failed random access procedure to determine whether or not to apply the transform precoder to the uplink signal when the first type or second type random access procedure fails.

The transmitting unit 202 may transmit the RRC parameter related to the transform precoder, and use the RRC parameter or the application state of the transform precoder before the execution of the failed random access procedure to determine whether or not to apply the transform precoder to the uplink signal when falling back from the second type random access procedure to the first type random access procedure.

Supplement

Various signals, information, and parameters in the aforementioned embodiment may be signaled in any layer. In other words, the various signals, information, and parameters mentioned above may be also replaced with signals, information, and parameters in any layer such as the higher layer (for example, a Non Access Stratum (NAS) layer, an RRC layer, a MAC layer, or the like) or the lower layer (for example, a physical layer). Further, given information is not limited to be explicitly informed and may also be implicitly informed (for example, by not informing the information or using any other information).

Further, the names of various signals, information, parameters, IE, channels, time units, and frequency units are just illustrative examples in the aforementioned embodiment, and the names may be replaced with other names. For example, each slot may be any other name as long as it is a time unit having a given number of symbols. Further, RB may be any other name as long as it is a frequency unit having a given number of subcarriers. Further, "first . . . " or "second . . . " is just to discriminate a plurality of pieces of information or signals from each other, and the order of the plurality of pieces of information or signals may be replaced appropriately.

For example, in the present embodiment, as an example of the physical channel for transferring the downlink data, the physical channel for transferring the uplink data, the physical channel for transferring the DCI, the physical channel for transferring the broadcast information, and the physical channel for transferring the random access preamble, PDSCH, PUSCH, PDCCH, PBCH, PRACH, and the like are exemplified, respectively, but the names are not limited to these as long as they are physical channels having the same functions. In addition, these physical channels may be paraphrased into transport channels to which the physical channels are mapped. In addition, each of the PDSCH, PUSCH, PDCCH, PBCH, PRACH, and the like may be paraphrased into a transport channel (for example, at least one of Downlink Shared Channel: DL-SCH, Uplink Shared Channel: UL-SCH, Broadcast Channel: BCH, and a Random Access Channel: RCH), and the like to which the physical channels are mapped. Further, these transport channels may be paraphrased into logical channels to which the transport channels are mapped. Further, the downlink data and the uplink data are downlink and uplink link data, respectively, and the data may include user data and control information (for example, a RRC parameter, a medium access control (MAC) parameter, or the like) of the higher layer.

Further, the applications of the terminal 10 in the aforementioned embodiment (for example, for RedCap, IoT, and the like) are not limited to those described herein, and the terminal 10 may also be used for any other purpose (for example, for eMBB, URLLC, Device-to-Device (D2D), Vehicle-to-Everything (V2X), or the like) as long as it has similar functions. Further, the format of various information is not limited to that in the aforementioned embodiment, and it may be changed accordingly such as to bit representation (0 or 1), Boolean (true or false), integer values, or characters. Further, the singular and the plural in the aforementioned embodiment may be mutually changed.

The embodiment described above is to facilitate the understanding of this disclosure, and it is not intended to limit the interpretation of this disclosure. The flowchart or the sequence described in the embodiment, and the alignment and arrangement of respective elements, indices, conditions, and the like included in the embodiment are not limited to those described and can be changed accordingly. Further, at least some of components described in the aforementioned embodiment can be partially replaced or combined.

The invention claimed is:

1. A terminal comprising:

a memory storing a program; and at least one processor that, by executing the program stored in the memory, is configured to:

receive, from a base station, system information including information for configuring a transform precoder to be enabled, receive, from the base station, a radio resource control (RRC) message including configuration information of a physical uplink shared channel (PUSCH), the configuration information including information for indicating whether or not to enable the transform precoder, receive on a physical downlink control channel (PDCCH), from the base station, a first downlink control information (DCI) format used for scheduling of a physical uplink shared channel (PUSCH), receive on the PDCCH, from the base station, a second DCI format used for scheduling of a PUSCH, apply, based on the information for configuring the transform precoder to be enabled, the transform precoder to transmission of the PUSCH scheduled by using the first DCI format in a case where the first DCI format is received, apply, based on information indicating whether or not to enable the transform precoder included in the second DCI format, the transform precoder to transmission of the PUSCH scheduled by using the second DCI format in a case where the second DCI format including the information indicating whether or not to enable the transform precoder is received, apply, based on the information for configuring the transform precoder to be enabled, the transform precoder to transmission of a PUSCH in a random access procedure in a case where the transmission of the PUSCH is scheduled in the random access procedure, and apply, based on the information for indicating whether or not to enable the transform precoder included in the configuration information, the transform precoder to transmission of the PUSCH scheduled by using the second DCI format in a case where the second DCI format not including the information indicating whether or not to enable the transform precoder is received.

2. The terminal according to claim 1, wherein the second DCI format is Cyclic Redundancy Check (CRC)-scrambled by C (Cell)-Radio Network Temporary Identifier (RNTI) or Modulation and Coding Scheme (MCS)-C-RNTI, or includes a new data identifier set to 1 and is CRC-scrambled by a Configured Scheduling (CS)-RNTI.

3. The terminal according to claim 1, wherein the PUSCH in the random access procedure is scheduled by using an Uplink (UL) grant included in a random access response (RAR) or a fallback RAR, and is used for transmission of a message 3.

4. The terminal according to claim 1, wherein the PUSCH in the random access procedure is configured by using information included in the system information, and is used for transmission of a message A.

5. The terminal according to claim 1, wherein the at least one processor is further configured to:

perform transmission of the PUSCH scheduled by using the first DCI format, to which the transform precoder is applied, perform transmission of the PUSCH scheduled by using the second DCI format including the information indicating whether or not to enable the transform precoder, to which the transform precoder is applied, perform transmission of the PUSCH scheduled in the random access procedure, to which the transform precoder is applied, and perform transmission of the PUSCH scheduled by using the second DCI format not including the information indicating whether or not to enable the transform precoder, to which the transform precoder is applied.

6. A base station comprising:

a memory storing a program; and at least one processor that, by executing the program stored in the memory, is configured to:

transmit, to a terminal, system information including information for configuring a transform precoder to be enabled, transmit, to the terminal, a radio resource control (RRC) message including configuration information of a physical uplink shared channel (PUSCH), the configuration information including information for indicating whether or not to enable the transform precoder, transmit on a physical downlink control channel (PDCCH), to the terminal, a first downlink control information (DCI) format used for scheduling of a physical uplink shared channel (PUSCH), transmit on the PDCCH, to the terminal, a second DCI format used for scheduling of a PUSCH, perform reception of the PUSCH scheduled by using the first DCI format, to which the transform precoder is applied based on the information for configuring the transform precoder to be enabled, perform reception of the PUSCH scheduled by using the second DCI format including information indicating whether or not to enable the transform precoder, to which the transform precoder is applied based on the information indicating whether or not to enable the transform precoder included in the second DCI format perform reception of a PUSCH scheduled in a random access procedure, to which the transform precoder is applied based on the information for configuring the transform precoder to be enabled, and perform reception of the PUSCH scheduled by using the second DCI format not including the information indicating whether or not to enable the transform precoder, to which the transform precoder is applied based on the information for indicating whether or not to enable the transform precoder included in the configuration information.

7. The base station according to claim 6, wherein the second DCI format is Cyclic Redundancy Check (CRC)-scrambled by C (Cell)-Radio Network Temporary Identifier (RNTI) or Modulation and Coding Scheme (MCS)-C-RNTI, or includes a new data identifier set to 1 and is CRC-scrambled by a Configured Scheduling (CS)-RNTI.

8. The base station according to claim 6, wherein the PUSCH in the random access procedure is scheduled by using an Uplink (UL) grant included in a random access response (RAR) or a fallback RAR, and is used for reception of a message 3.

9. The base station according to claim 6, wherein the PUSCH in the random access procedure is configured by using information included in the system information, and is used for reception of a message A.

10. A method of a terminal comprising steps of:

receiving, from a base station, system information including information for configuring a transform precoder to be enabled;

receiving, from the base station, a radio resource control (RRC) message including configuration information of a physical uplink shared channel (PUSCH), the configuration information including information for indicating whether or not to enable the transform precoder;

receiving on a physical downlink control channel (PDCCH), from the base station, a first downlink control information (DCI) format used for scheduling of a physical uplink shared channel (PUSCH);

receiving on the PDCCH, from the base station, a second DCI format used for scheduling of a PUSCH;

applying, based on the information for configuring the transform precoder to be enabled, the transform precoder to transmission of the PUSCH scheduled by using the first DCI format in a case where the first DCI format is received;

applying, based on information indicating whether or not to enable the transform precoder included in the second DCI format, the transform precoder to transmission of the PUSCH scheduled by using the second DCI format in a case where the second DCI format including the information indicating whether or not to enable the transform precoder is received;

applying, based on the information for configuring the transform precoder to be enabled, the transform precoder to transmission of a PUSCH in a random access procedure in a case where the transmission of the PUSCH is scheduled in the random access procedure; and applying, based on the information for indicating whether or not to enable the transform precoder included in the configuration information, the transform precoder to transmission of the PUSCH scheduled by using the second DCI format in a case where the second DCI format not including the information indicating whether or not to enable the transform precoder is received.

11. The method according to claim 10, wherein the second DCI format is Cyclic Redundancy Check (CRC)-scrambled by C (Cell)-Radio Network Temporary Identifier (RNTI) or Modulation and Coding Scheme (MCS)-C-RNTI, or includes a new data identifier set to 1 and is CRC-scrambled by a Configured Scheduling (CS)-RNTI.

12. The method according to claim 10, wherein the PUSCH in the random access procedure is scheduled by using an Uplink (UL) grant included in a random access response (RAR) or a fallback RAR, and is used for transmission of a message 3.

13. The method according to claim 10, wherein the PUSCH in the random access procedure is configured by using information included in the system information, and is used for transmission of a message A.

14. The method according to claim 10, further comprising:

performing transmission of the PUSCH scheduled by using the first DCI format, to which the transform precoder is applied, performing transmission of the PUSCH scheduled by using the second DCI format including the information indicating whether or not to enable the transform precoder, to which the transform precoder is applied, performing transmission of the PUSCH scheduled in the random access procedure, to which the transform precoder is applied, and performing transmission of the PUSCH scheduled by using the second DCI format not including the information indicating whether or not to enable the transform precoder, to which the transform precoder is applied.

* * * * *